(12) United States Patent
Priyadarshan et al.

(10) Patent No.: US 8,990,103 B2
(45) Date of Patent: Mar. 24, 2015

(54) BOOKING AND MANAGEMENT OF INVENTORY ATOMS IN CONTENT DELIVERY SYSTEMS

(75) Inventors: Eswar Priyadarshan, West Roxbury, MA (US); Dan Marius Grigorovici, Pleasanton, CA (US); Omar Abdala, Cambridge, MA (US); Hao Duong, Castro Valley, CA (US)

(73) Assignee: Apple Inc., Cupertino, CA (US)

( * ) Notice: Subject to any disclaimer, the term of this patent is extended or adjusted under 35 U.S.C. 154(b) by 174 days.

(21) Appl. No.: 12/848,721

(22) Filed: Aug. 2, 2010

(65) Prior Publication Data

US 2012/0030036 A1 Feb. 2, 2012

(51) Int. Cl.
*G06Q 30/00* (2012.01)
*G06Q 30/02* (2012.01)

(52) U.S. Cl.
CPC ........ *G06Q 30/0243* (2013.01); *G06Q 30/0249* (2013.01); *G06Q 30/02* (2013.01); *G06Q 30/0277* (2013.01)
USPC .................................... 705/14.42; 705/14.48

(58) Field of Classification Search
CPC ....................... G06Q 30/0249; G06Q 30/0243
USPC .......................................... 705/14.48, 14.42
See application file for complete search history.

(56) References Cited

U.S. PATENT DOCUMENTS

| | | | |
|---|---|---|---|
| 5,381,470 A | 1/1995 | Cambray et al. | |
| 5,613,213 A | 3/1997 | Naddell et al. | |
| 5,768,521 A | 6/1998 | Dedrick | |
| 5,978,775 A | 11/1999 | Chen | |
| 5,978,833 A | 11/1999 | Pashley et al. | |
| 6,078,866 A | 6/2000 | Buck et al. | |
| 6,250,557 B1 | 6/2001 | Forslund et al. | |
| 6,253,189 B1 | 6/2001 | Feezell et al. | |

(Continued)

FOREIGN PATENT DOCUMENTS

| | | |
|---|---|---|
| BE | 1015704 | 7/2005 |
| DE | 19941461 | 3/2001 |

(Continued)

OTHER PUBLICATIONS

"ETSI TS 100 900 V7.2.0 (Jul. 1999):", Digital Cellular Telecommunication System (Phase 2+); Alphabets and language-specific information (GSM 03.38 Version 7.2.0 Release 1998), European Telecommunications Standards Institute 1999.

(Continued)

*Primary Examiner* — James W Myhre
(74) *Attorney, Agent, or Firm* — Novak Druce Connolly Bove + Quigg LLP

(57) ABSTRACT

Systems and methods for managing electronic content from multiple content providers in a dynamic environment are provided. In operation, an advertiser can plan and book an electronic advertisement campaign by providing a campaign request specifying a requested inventory slot of atoms in an inventory space and other associated data. Thereafter, a proposed campaign can be generated based on an estimated availability of the atoms and any performance criteria specified by the advertiser. Once the proposed campaign is accepted and booked, the proposed campaign can be managed along with other active campaigns. These active campaigns can be managed based on a relative priority of the campaigns and an estimated availability for the atoms in the inventory space.

21 Claims, 15 Drawing Sheets

(56) References Cited

U.S. PATENT DOCUMENTS

| | | |
|---|---|---|
| 6,269,361 B1 | 7/2001 | Davis et al. |
| 6,334,110 B1 | 12/2001 | Walter et al. |
| 6,334,145 B1 | 12/2001 | Adams et al. |
| 6,408,309 B1 | 6/2002 | Agarwal |
| 6,502,076 B1 | 12/2002 | Smith |
| 6,871,183 B2 | 3/2005 | Gilday et al. |
| 6,920,464 B2 | 7/2005 | Fox |
| 7,200,633 B2 | 4/2007 | Sekiguchi et al. |
| 7,213,742 B1 | 5/2007 | Birch et al. |
| 7,406,307 B2 | 7/2008 | Manto |
| 7,406,434 B1 | 7/2008 | Chang et al. |
| 7,428,555 B2 | 9/2008 | Yan |
| 7,478,065 B1 | 1/2009 | Ritter et al. |
| 7,487,126 B2 | 2/2009 | Kwan |
| 7,533,047 B2 | 5/2009 | Hagale et al. |
| 7,540,408 B2 | 6/2009 | Levine et al. |
| 7,546,619 B2 * | 6/2009 | Anderson et al. ............... 725/35 |
| 7,552,867 B2 | 6/2009 | Waltman |
| 7,562,058 B2 | 7/2009 | Pinto et al. |
| 7,660,581 B2 | 2/2010 | Ramer et al. |
| 7,668,950 B2 | 2/2010 | Horowitz et al. |
| 7,676,405 B2 | 3/2010 | Steelberg et al. |
| 7,698,163 B2 | 4/2010 | Reed et al. |
| 7,742,996 B1 | 6/2010 | Kwan |
| 7,764,947 B2 | 7/2010 | Koskinen et al. |
| 7,805,332 B2 | 9/2010 | Wilson |
| 7,949,561 B2 * | 5/2011 | Briggs ....................... 705/14.41 |
| 7,949,562 B2 * | 5/2011 | Collins ....................... 705/14.43 |
| 7,974,988 B2 | 7/2011 | Nandiwada et al. |
| 7,991,140 B2 | 8/2011 | Pines |
| 8,014,755 B2 | 9/2011 | Sun et al. |
| 8,090,613 B2 | 1/2012 | Kalb et al. |
| 8,099,316 B2 | 1/2012 | Moukas et al. |
| 8,099,490 B2 | 1/2012 | Deakin |
| 2001/0007983 A1 | 7/2001 | Lee |
| 2002/0006803 A1 | 1/2002 | Mendiola et al. |
| 2002/0019829 A1 | 2/2002 | Shapiro |
| 2002/0035568 A1 | 3/2002 | Benthin et al. |
| 2002/0075305 A1 | 6/2002 | Beaton et al. |
| 2002/0077993 A1 | 6/2002 | Immonen et al. |
| 2002/0091569 A1 | 7/2002 | Kitaura et al. |
| 2002/0111848 A1 | 8/2002 | White |
| 2002/0120498 A1 | 8/2002 | Gordon et al. |
| 2002/0128908 A1 | 9/2002 | Levin et al. |
| 2002/0138291 A1 | 9/2002 | Vaidyanathan et al. |
| 2002/0165831 A1 | 11/2002 | Horn et al. |
| 2002/0177431 A1 | 11/2002 | Hamilton et al. |
| 2002/0198849 A1 | 12/2002 | Piikivi |
| 2003/0040297 A1 | 2/2003 | Pecen et al. |
| 2003/0074259 A1 | 4/2003 | Slyman et al. |
| 2003/0126015 A1 | 7/2003 | Chan et al. |
| 2003/0171990 A1 | 9/2003 | Rao et al. |
| 2003/0197719 A1 | 10/2003 | Lincke et al. |
| 2004/0068435 A1 * | 4/2004 | Braunzell ....................... 705/14 |
| 2004/0093289 A1 | 5/2004 | Bodin |
| 2004/0133480 A1 | 7/2004 | Domes |
| 2004/0203851 A1 | 10/2004 | Vetro et al. |
| 2004/0204133 A1 | 10/2004 | Andrew et al. |
| 2004/0209649 A1 | 10/2004 | Lord |
| 2004/0259526 A1 | 12/2004 | Goris et al. |
| 2004/0260767 A1 * | 12/2004 | Kedem et al. ............... 709/203 |
| 2004/0267663 A1 | 12/2004 | Karns et al. |
| 2005/0021457 A1 | 1/2005 | Johnson et al. |
| 2005/0075929 A1 | 4/2005 | Wolinsky et al. |
| 2005/0125289 A1 | 6/2005 | Beyda et al. |
| 2005/0125397 A1 | 6/2005 | Gross et al. |
| 2005/0160002 A1 | 7/2005 | Roetter et al. |
| 2005/0177506 A1 | 8/2005 | Rissanen |
| 2005/0222949 A1 | 10/2005 | Inotay et al. |
| 2005/0228680 A1 | 10/2005 | Malik |
| 2005/0229209 A1 | 10/2005 | Hildebolt et al. |
| 2005/0239504 A1 | 10/2005 | Ishii et al. |
| 2005/0240475 A1 | 10/2005 | Margiloff et al. |
| 2005/0267798 A1 | 12/2005 | Panara |
| 2005/0273465 A1 | 12/2005 | Kimura |
| 2005/0281237 A1 | 12/2005 | Heinonen et al. |
| 2006/0026063 A1 * | 2/2006 | Collins ....................... 705/14 |
| 2006/0026067 A1 | 2/2006 | Nicholas et al. |
| 2006/0048059 A1 | 3/2006 | Etkin |
| 2006/0068845 A1 | 3/2006 | Muller et al. |
| 2006/0117378 A1 | 6/2006 | Tam et al. |
| 2006/0123014 A1 | 6/2006 | Ng |
| 2006/0165060 A1 | 7/2006 | Dua |
| 2006/0173772 A1 | 8/2006 | Hayes et al. |
| 2006/0200460 A1 | 9/2006 | Meyerzon et al. |
| 2006/0240850 A1 | 10/2006 | Kaplan |
| 2006/0271438 A1 | 11/2006 | Shotland et al. |
| 2006/0286963 A1 | 12/2006 | Koskinen et al. |
| 2006/0286964 A1 | 12/2006 | Polanski et al. |
| 2006/0288124 A1 | 12/2006 | Kraft et al. |
| 2007/0005429 A1 | 1/2007 | Jacobs et al. |
| 2007/0050372 A1 | 3/2007 | Boyle |
| 2007/0060109 A1 | 3/2007 | Ramer et al. |
| 2007/0066295 A1 | 3/2007 | Wennberg |
| 2007/0074262 A1 | 3/2007 | Kikkoji et al. |
| 2007/0094066 A1 | 4/2007 | Kumar et al. |
| 2007/0094113 A1 | 4/2007 | Chapeta |
| 2007/0100805 A1 | 5/2007 | Ramer et al. |
| 2007/0105536 A1 | 5/2007 | Tingo, Jr. |
| 2007/0106564 A1 | 5/2007 | Matotek et al. |
| 2007/0150411 A1 | 6/2007 | Addepalli et al. |
| 2007/0162328 A1 | 7/2007 | Reich |
| 2007/0162337 A1 | 7/2007 | Hawkins et al. |
| 2007/0174124 A1 | 7/2007 | Zagofsky |
| 2007/0244750 A1 | 10/2007 | Grannan et al. |
| 2007/0271134 A1 | 11/2007 | Ferry et al. |
| 2008/0052158 A1 | 2/2008 | Ferro et al. |
| 2008/0057917 A1 | 3/2008 | Oria |
| 2008/0057920 A1 | 3/2008 | Pettit et al. |
| 2008/0065474 A1 | 3/2008 | Sharma et al. |
| 2008/0065491 A1 | 3/2008 | Bakman |
| 2008/0102766 A1 | 5/2008 | Schultz |
| 2008/0103895 A1 | 5/2008 | Burdick et al. |
| 2008/0154727 A1 | 6/2008 | Carlson |
| 2008/0201731 A1 | 8/2008 | Howcroft |
| 2008/0221989 A1 | 9/2008 | Messer et al. |
| 2008/0228893 A1 | 9/2008 | MacDonald et al. |
| 2008/0249850 A1 | 10/2008 | Szybalski et al. |
| 2008/0263460 A1 | 10/2008 | Altberg et al. |
| 2008/0306820 A1 | 12/2008 | Passmore |
| 2009/0037239 A1 | 2/2009 | Wong et al. |
| 2009/0043644 A1 | 2/2009 | Wilkman |
| 2009/0048905 A1 | 2/2009 | Feng et al. |
| 2009/0106100 A1 | 4/2009 | Mashinsky |
| 2009/0157546 A1 | 6/2009 | Garcia et al. |
| 2009/0199107 A1 | 8/2009 | Lewis et al. |
| 2009/0222316 A1 | 9/2009 | Boinepalli et al. |
| 2009/0276317 A1 | 11/2009 | Dixon et al. |
| 2009/0282052 A1 | 11/2009 | Evans et al. |
| 2010/0082439 A9 | 1/2010 | Patel et al. |
| 2010/0082401 A1 | 4/2010 | Vee et al. |
| 2010/0100407 A1 | 4/2010 | Lin et al. |
| 2010/0106606 A1 | 4/2010 | Filice et al. |
| 2010/0121694 A1 | 5/2010 | Bharadwaj et al. |
| 2010/0131352 A1 | 5/2010 | Malhotra et al. |
| 2010/0235219 A1 * | 9/2010 | Merrick et al. ................ 705/10 |
| 2011/0137941 A1 | 6/2011 | Hoffman et al. |
| 2011/0208580 A1 * | 8/2011 | Wolinsky ................ 705/14.48 |

FOREIGN PATENT DOCUMENTS

| | | |
|---|---|---|
| DE | 20008040 | 3/2005 |
| EP | 1003344 | 5/2000 |
| EP | 1109371 | 6/2001 |
| EP | 1182845 | 2/2002 |
| EP | 1303107 | 4/2003 |
| EP | 1280087 | 6/2003 |
| EP | 1320214 | 6/2003 |
| EP | 1528827 | 5/2005 |
| EP | 1594287 | 11/2005 |
| EP | 1633100 | 3/2006 |
| EP | 1772822 | 4/2007 |
| EP | 2196957 | 6/2010 |
| GB | 2372867 | 9/2002 |

(56) References Cited

FOREIGN PATENT DOCUMENTS

| | | |
|---|---|---|
| GB | 2414621 | 11/2005 |
| JP | 2002140272 | 5/2002 |
| WO | 98/36585 | 8/1998 |
| WO | 00/52621 | 9/2000 |
| WO | WO 00/52621 A2 | 9/2000 |
| WO | 01/22748 | 3/2001 |
| WO | 01/31497 | 5/2001 |
| WO | 01/33797 | 5/2001 |
| WO | 01/44977 | 6/2001 |
| WO | 0143416 | 6/2001 |
| WO | 01/57705 | 8/2001 |
| WO | 01/63423 | 8/2001 |
| WO | 01/65411 | 9/2001 |
| WO | 01/71949 | 9/2001 |
| WO | 01/91021 | 11/2001 |
| WO | 02/30133 | 4/2002 |
| WO | 02/41178 | 5/2002 |
| WO | 02/44989 | 6/2002 |
| WO | 02/071626 A2 | 8/2002 |
| WO | 02/069585 | 9/2002 |
| WO | 02/071626 | 9/2002 |
| WO | 02/096026 | 11/2002 |
| WO | 02/096056 | 11/2002 |
| WO | 03/015430 | 2/2003 |
| WO | 03/024136 | 3/2003 |
| WO | 03/058458 | 7/2003 |
| WO | 03/058524 | 7/2003 |
| WO | 03/073304 | 9/2003 |
| WO | 2004/100470 | 11/2004 |
| WO | 2005/029769 | 3/2005 |
| WO | 2005/073863 | 8/2005 |
| WO | 2006/011164 | 2/2006 |
| WO | 2006/024003 | 3/2006 |
| WO | 2006/119481 | 11/2006 |
| WO | 2006/122042 | 11/2006 |
| WO | 2006/122042 A2 | 11/2006 |
| WO | 2007/002025 | 1/2007 |
| WO | 2007/031708 | 3/2007 |
| WO | 2007/060451 | 5/2007 |
| WO | 2007/091089 | 8/2007 |
| WO | 2010/018584 | 2/2010 |
| WO | 2010/018584 A1 | 2/2010 |

OTHER PUBLICATIONS

"European Search Report date May 23, 2008", European Patent Application No. 08101226.

"Examination Report under section 18(3)", dated Jan. 23, 2009 issued in related UK Application No. GB 0802989.4 (5 pages).

"Extended European search Report dated Mar. 17, 2008", European Application No. 08101544.8.

"International Preliminary Report on Patentability and Written Opinion", Issued Nov. 24, 2009 in International Application No. PCT/IB2008/002897.

"International Preliminary Report on Patentability and Written Opinion", mailed Dec. 30, 2009 in related International Application PCT/EP2008/057438.

"International Search Report (Form PCT/ISA/210) mailed Jan. 22, 2009", International Application No. PCT/EP2008/057438.

"Office Action dated Feb. 18, 2011 issued by USPTO", Related U.S. Appl. No. 12/288,690 (38 pages).

"Office Action dated Mar. 31, 2011", Issued in Related U.S. Appl. No. 12/290,140.

"Office Action issued Oct. 19, 2010", USPTO in related U.S. Appl. No. 12/290,140 (11 pages).

"Partial European Search Report", dated Apr. 25, 2008 for European Application No. EP 08151800.3.

"PCT International Search Report from PCT International", searching Authority mailed May 8, 2009 in a related PCT Application No. PCT/EP2009/050144 (4 pages).

"PCT Written Opinion from PCT International Searching Authority", mailed May 8, 2009 in a related PCT Application No. PCT/EP2009/050144 (5 pages).

"U.K. Search Report under Section 17 dated Jun. 4, 2008", U.K. Application No. GB0803468.8.

"UKIPO Search Report dated May 30, 2008", UK Application No. GB0802175.

"United Kingdom Search Report dated Sep. 18, 2007", United Kingdom Patent Application No. GB0709331.3.

"WAG UAProf Version Oct. 20, 2001; Wireless Applcation Protocol", WAP-248-UAPROF-20011020-a, Wireless Application Protocol Forum, Ltd. (2001); http://www.wapforum.org/what/copyright.htm.

"Written Opinion of the International Searching Authority (Form PCT/ISA/237)", Dated Jan. 22, 2009 in related International Application No. PCT/EP2008/057438.

LV, Qin et al., "Multi-Probe LSH: Efficient Indexing for High Dimensional Similarity Search", 2007, Department of Computer Science, Princeton University, Sep. 23, 2007, 12 pages.

* cited by examiner

LOGO

Welcome "john" | LOG OUT

Dashboard | Organizations | Forecasting | Trafficking | Admin | Analytics | Billing | Help CREATE A RESERVATION                                             CREATE RESERVATION ⁺Advertiser Name: [_____]           ⁺Budget %: [_____]  — 1302

⁺Ad Model: [__◁▷__]                  ⁺Sold By: [__◁▷__]   — 1304

⁺Start Date: [__▦__]                 ⁺End Date: [__▦__]

Opportunity ID: [_____]

| GEOGRAPHY ✓ | AUDIENCE | DEVICE | MEDIA |   — 1306, 1308

Country (1 of 1 Selected)          Zip Code (0 of 1 Selected)

☑ All Countries
 ⊞ ☑ North America (US and Canada)     ☑ United States    ☑ Guam
    ☑ Saint Pierre and Miquelon        ☑ Norther Mariana Islands   ☑ Mexico
    ☑ Greenland                        ☑ Canada
    ☑ Puerto Rico
 ⊞ ☐ Latin America and the Carribean
 ⊞ ☐ Western Europe
 ⊞ ☐ Eastern Europe
 ⊞ ☐ Africa
 ⊞ ☐ Asia
 ⊞ ☐ Oceania (Australia, Melanesia, Micronesia, Polynesia)

— 1310, 1312

Lorem ipsum dolor sit amet, consectetur adipiscing elit. Maecenas gravida mi eu leo faucibus eget
luctus odio ullamcorper. Etiam suscipit aliquet accumsan. Nam tincidunt molestie lorem Target Name: [_____]          Budget %: [_____]

[ SAVE ]  [ RESET ]

Target Summary

| Ad Requests | Allocated Requests | Unallocated Available | Budget Used |
|---|---|---|---|
| 534,000,000 | 326,000,000 | 251,000,000 | 100.00% |

Export CSV    CREATE NEW TARGET

Target Details

| | Target Name ▲ | Ad Requests | Allocated Requests | Unallocated Available | Reserved Impressions | Projected Avails | Available Fill | Budget Used | Actions |
|---|---|---|---|---|---|---|---|---|---|
| ○ | Hellos-US Mens | 130,000,000 | 2,000,000 | 129,000,000 | 1,000,000 | 1,000,000 | 10.33% ○ | 30.00% | Select an action ⇔ |
| ○ | Hellos-US Wom. | 14,000,000 | 500,000 | 13,500,000 | 12,999,000 | 34,000,000 | 56.77% ○ | 55.00% | Select an action ⇔ |
| ○ | Hellos-US Sports | 35,000,000 | 3000 | 34,997,000 | 3,599,000 | 833,000 | 28.00% ○ | 28.00% | Select an action ⇔ |
| ○ | Hellos-Asia Sports | 20,000,000 | 1,500,000 | 19,500,000 | 22,000,000 | 436,000 | 44.90% ○ | 44.00% | Select an action ⇔ |
| ○ | UK-F-25-35 y.. | 25,000,000 | 20,000,000 | 5,000,000 | 1000 | 200,000,000 | 0.00% ○ | 16.00% | Select an action ⇔ |
| ○ | UK-F-25-35 yrs. | 345,000,000 | 300,000,000 | 45,000,000 | 27,290,000 | 212,000 | 44.32% ○ | 20.00% | Select an action ⇔ |
| ○ | AU-F-25-35 yrs. | 130,000,000 | 2,000,000 | 2,000,000 | 4,560,000 | 12,500,000 | 7.00% ○ | 7.00% | Edit Target<br>Copy Target<br>Delete Reservation |
| ○ | JP-F-25-35 yrs. | 14,000,000 | 500,000 | 62,500,000 | 8,939,000 | 123,300,000 | 28.06% ○ | 30.00% | Select an action ⇔ |
| ○ | FR-F-25-35 yrs. | 35,000,000 | 3000 | 7,000,000 | 887,432 | 1,000,000 | 76.55% ○ | 76.55% | Select an action ⇔ |
| ○ | BT-F-25-35 yrs. | 20,000,000 | 1,500,000 | 4,000,000 | 3 | 5,900,000 | 3.97% ○ | 10.00% | Select an action ⇔ |
| ○ | DR-F-25-35 yrs. | 25,000,000 | 20,000,000 | 12,000,000 | 6 | 99,000 | 6.23% ○ | 10.00% | Select an action ⇔ |
| ○ | PA-M-25-35 yrs. | 345,000,000 | 300,000,000 | 1,000,000 | 1 | 78,200 | 2.76% ○ | 4.00% | Select an action ⇔ |
| ○ | EU-M-25-35 yrs. | 25,000,000 | 232,000 | 8,000,000 | 889,875 | 1,000,000 | 88.30% ○ | 45.00% | Select an action ⇔ |
| ○ | CA-M-25-35 yrs. | 345,000,000 | 9000 | 13,000,000 | 1 | 20,000 | 2.70% ● | 8.00% | Select an action ⇔ |

Lorem ipsum dolor sit amet, consectetur adipiscing elit. Maecenas gravida mi eu leo faucibus eget luctus odio ullamcorper. Etiam suscipit aliquet accumsan. Nam tincidunt molestie lorem non laoreet. Duis eu lacus quis tuis turpis pharetra laoreet ut vel dui. Morbi at nulla vitae ipsum Reservation Name: [       ]    SAVE    CANCEL

| LOGO | | | | | Welcome "john" LOG OUT |
|---|---|---|---|---|---|
| | | | | Dashboard \| Organizations \| Forecasting \| Trafficking \| Admin \| Analytics \| Billing \| Help | |
| MANAGE RESERVATIONS | | | CREATE RESERVATION | Q Search | |

| Reservation Name ▲ | Opportunity ID | Reserved Impressions | Projected Avails | Available Fill | Expiration Date | Actions |
|---|---|---|---|---|---|---|
| Acura TL 2011 1st QTR | 29390423 | 1,000,000 | 1,000,000 | 10.33% | ○01-01-2011 | Select an action ◆ |
| Amyway Global-New Work | NA | 12,999,000 | 34,000,000 | 56.77% | ○06-01-2011 | Select an action ◆ |
| Amyway Global-Los Angeles Atl.. | NA | 3,599,000 | 833,000 | 28.00% | ○04-01-2011 | Select an action ◆ |
| Duracell NextGen-Gold Edition | 11124344 | 22,000,000 | 436,000 | 44.90% | ○09-22-2011 | Select an action ◆ |
| Faber Marsk 33.129 | NA | 1000 | 200,000,000 | 0.00% | ○11-01-2011 | Select an action ◆ |
| Goodyear Parade US,CA | NA | 27,290,000 | 212,000 | 44.32% | ○02-01-2011 | Select an action ◆ |
| Helios-Males US 18+ | 44558769 | 4,560,000 | 12,500,000 | 7.00% | ○07-29-2011 | Select an action ◆ |
| Helios-Females US 18+ | 39494873 | 8,939,000 | 123,300,000 | 28.06% | ○12-25-2010 | Select an action ◆ |
| IPhone Subs | NA | 987,432 | 1,000,000 | 76.55% | ○02-14-2010 | Edit Reservation / Copy Reservation / Delete Reservation / Renewal Reservation |
| Mercedes Benz -Male 30-50 US | 77777777 | 3 | 5,9000,000 | 3.97% | ○08-15-2011 | |
| Michellin-East Coast | 39399999 | 6 | 99,000 | 6.23% | ○10-19-2010 | |
| Pixar-Asia Animation Target | 12121213 | 1 | 78,200 | 2.76% | ○06-17-2011 | Select an action ◆ |
| Pixar-Brazil Target | 12121214 | 889,876 | 1,000,000 | 88.30% | ○08-22-2010 | Select an action ◆ |
| Pixar-Kids - North America | 12121245 | 1 | 20,000 | 2.70% | ○09-05-2010 | Select an action ◆ |
| Seymour Cheyne Audio | NA | 2 | 5,800,000 | 5.00% | ●07-22-2010 | Select an action ◆ |
| Seymour Cheyne Music | NA | 0 | 37,900,000 | 0.00% | ○09-12-2010 | Select an action ◆ |
| Seymour Cheyne Text | NA | 0 | 87,900,000 | 0.00% | ○01-28-2011 | Select an action ◆ |
| Seymour Cheyne Video | NA | 0 | 76,650 | 0.06% | ○12-04-2010 | Select an action ◆ |
| Titus and Stoughton - Doctors | 32211221 | 0 | 679,000 | 0.55% | ○03-27-2011 | Select an action ◆ |
| Virgin America #212 | 56565656 | 444,555 | 3,500,000 | 54.67% | ●07-20-2010 | Select an action ◆ |
| Virgin America #422 | 57575757 | 233,667 | 4,700,00 | 23.88% | ○04-23-2010 | Select an action ◆ |

Reservations 25 of 50    ◁ 1 | 2 ▶

FIG. 14

BOOKING AND MANAGEMENT OF INVENTORY ATOMS IN CONTENT DELIVERY SYSTEMS

FIELD

The following relates to advertisement inventory and more specifically relates to systems and methods for booking and management of inventory atoms in content delivery systems.

BACKGROUND

Computer applications, websites, or other electronic content including offers for products and services generally require a user to explicitly select and/or interact with one or more portions of the content being presented to generate a conversion (e.g., completion of a sale or purchase, submission of information to a content provider, causing delivery of additional information to the user or any other pre-defined response for the content). For example, an advertisement for a product or service can require the user to select the advertisement and navigate to the online store offering the product for sale. At the online store, the user can then enter information to purchase or obtain additional information regarding the product or service.

In many types of electronic content maintained by content providers, the portions of the content offering products and services are generally not static. Rather, such (primary) content providers may offer such portions, directly or via an agent, for use by one or more other (secondary) content providers. Thus, the content in these portions will typically vary over time, depending on the arrangement between the primary and secondary content providers. Additionally, the number of primary content providers, the number of secondary content providers, the number of user accessing content, and the number of available portions of the content maintained by the primary content providers available to secondary content providers can also all vary over time. As a result, primary content providers (or their agent) are generally faced with a non-trivial task of managing sale and use of these content portions for secondary content providers.

SUMMARY

Accordingly, the present technology provides systems and methods for managing electronic content from multiple content providers. A first aspect of the present technology provides systems and methods for planning and booking electronic advertisement campaigns. A second aspect of the present technology provides systems and method for managing these booked campaigns in a dynamic environment.

The planning and booking can occur as follows. First, campaign requests are received at a booking engine associated with a content delivery system that manages allocation of atoms from an inventory space. For example, the advertiser can submit such a request via a user terminal in communications with the booking engine. These campaign requests can be configured to specify, for example, the performance level required by the advertiser for the campaign, other data associated with the campaign, and one or more inventory slots specifying atoms from the inventory space.

Responsive to such a request, the booking engine can generate and deliver a proposed campaign to advertiser via the user interface, where the proposed campaign comprises a proposed set of atoms for the advertiser. The proposed campaign can be assembled by the booking engine based on an estimate of the availability of atoms in the inventory space and any other criteria specified in the campaign request. Once the proposed campaign is accepted at the user terminal, this accepted campaign can be managed by the content delivery system along with the other active campaigns, including booked campaigns not yet underway.

In the present technology the proposed campaign is assembled by modeling an availability of the atoms based on a history of the atoms in the inventory space. This can include considering the inventory atoms to be allocated to booked campaigns and other reserved inventory atoms. Thereafter the proposed inventory slot can be assembled by selecting a group of atoms that the modeling indicates are available and that will meet the performance criteria specified for the campaign. The proposed inventory slot thus identifies atoms for the next time interval and one or more subsequent time intervals.

The management of booked campaigns operates as follows. First, the content delivery system can identify campaigns that are currently booked or active and retrieve the data associated with these campaigns. Thereafter, the campaign data can be used by the content delivery system to obtain a priority ranking for the active campaigns. Once this priority ranking is computed and an availability of the atoms in the inventory space is ascertained, the atoms can be allocated to the active campaigns. The availability of the atoms during allocation can be based on a history of the atoms. Additionally, there can be inventory atoms that are reserved (but not necessarily booked) and are therefore unavailable. As a result, the availability of the atoms can be adjusted further. Further, the atoms can be allocated based on the priority ranking, as well as any other criteria. For example, the allocation can be made to ensure that a performance level for a next time interval and/or the entire campaign is met. In the present technology, the priority ranking can be obtained by calculating a relative priority of each of the active campaigns based on some criteria. For example, pre-defined criteria can be specified that associates certain types of campaign data with a level of priority.

BRIEF DESCRIPTION OF THE DRAWINGS

FIG. 13 shows a first exemplary screen of a user interface for booking and managing electronic campaigns; and FIG. 14 shows a first exemplary screen of a user interface for booking and managing electronic campaigns.

DESCRIPTION

Various embodiments of the disclosed methods and arrangements are discussed in detail below. While specific implementations are discussed, it should be understood that this is done for illustration purposes only. A person skilled in the relevant art will recognize that other components, configurations, and steps may be used without parting from the spirit and scope of the disclosure.

Figure 1:
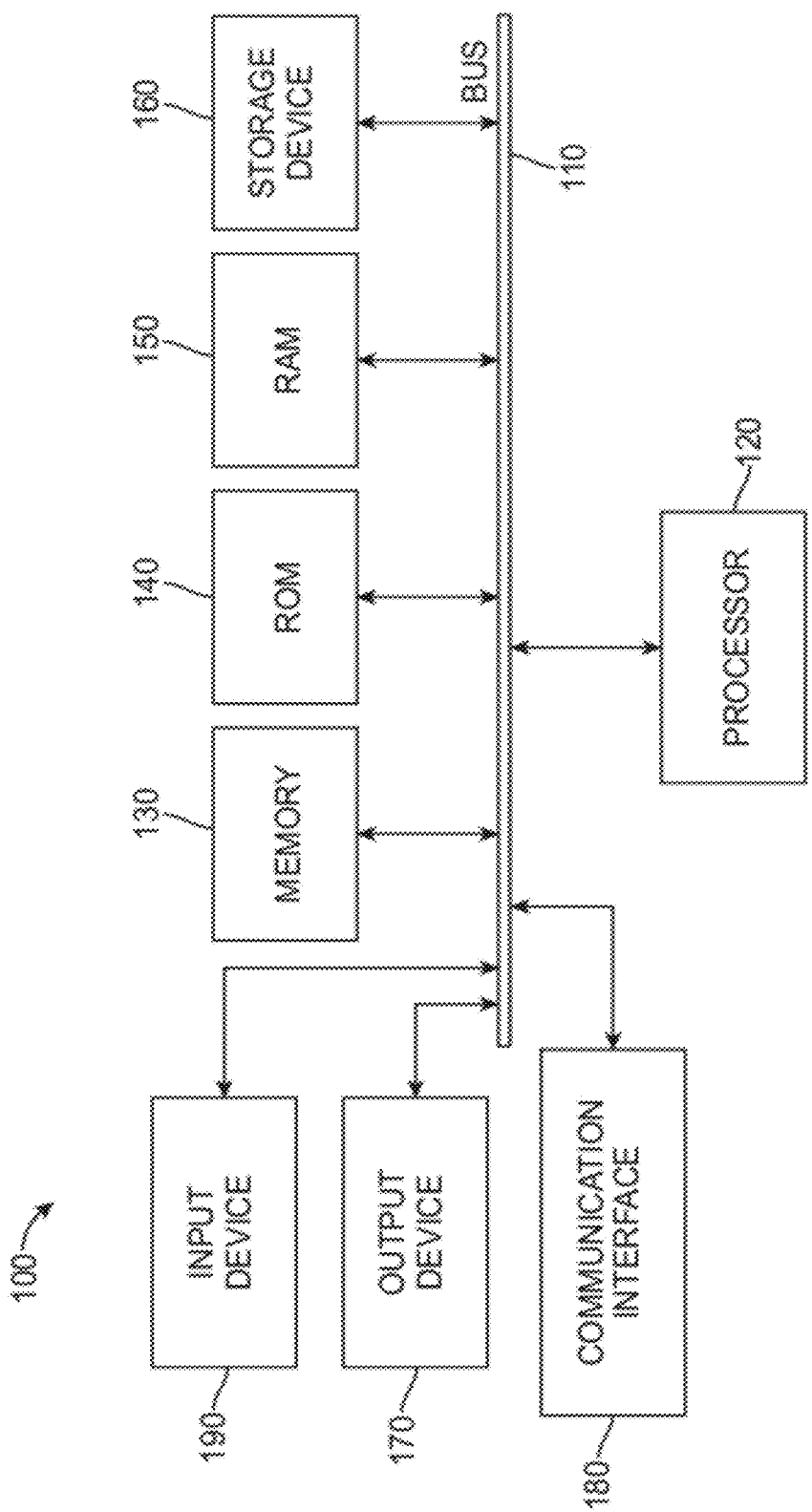
FIG. 1 illustrates an example computing device.

With reference to FIG. 1, a general-purpose computing device 100 which can be portable or stationary is shown, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the system may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. In one aspect, a hardware module that performs a particular function includes the software component stored in a tangible computer-readable medium in connection with the necessary hardware components, such as the CPU, bus, display, and so forth, to carry out the function. The basic components are known to those of skill in the art and appropriate variations are contemplated depending on the type of device, such as whether the device is a small, handheld computing device, a desktop computer, or a large computer server.

Although the exemplary environment described herein employs a hard disk, it should be appreciated by those skilled in the art that other types of computer readable media which can store data that is accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The device output 170 can also be one or more of a number of output mechanisms known to those of skill in the art. For example, video output or audio output devices which can be connected to or can include displays or speakers are common. Additionally, the video output and audio output devices can also include specialized processors for enhanced performance of these specialized functions. In some instances, multimodal systems enable a user to provide multiple types of input to communicate with the computing device 100. The communications interface 180 generally governs and manages the user input and system output. There is no restriction on the disclosed methods and devices operating on any particular hardware arrangement and therefore the basic features may easily be substituted for improved hardware or firmware arrangements as they are developed. For clarity of explanation, the illustrative system embodiment is presented as including individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) for storing software performing the operations discussed below, and random access memory (RAM) for storing results. Very large scale integration (VLSI), field-programmable gate array (FPGA), and application specific integrated circuit (ASIC) hardware embodiments may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

Figure 2:
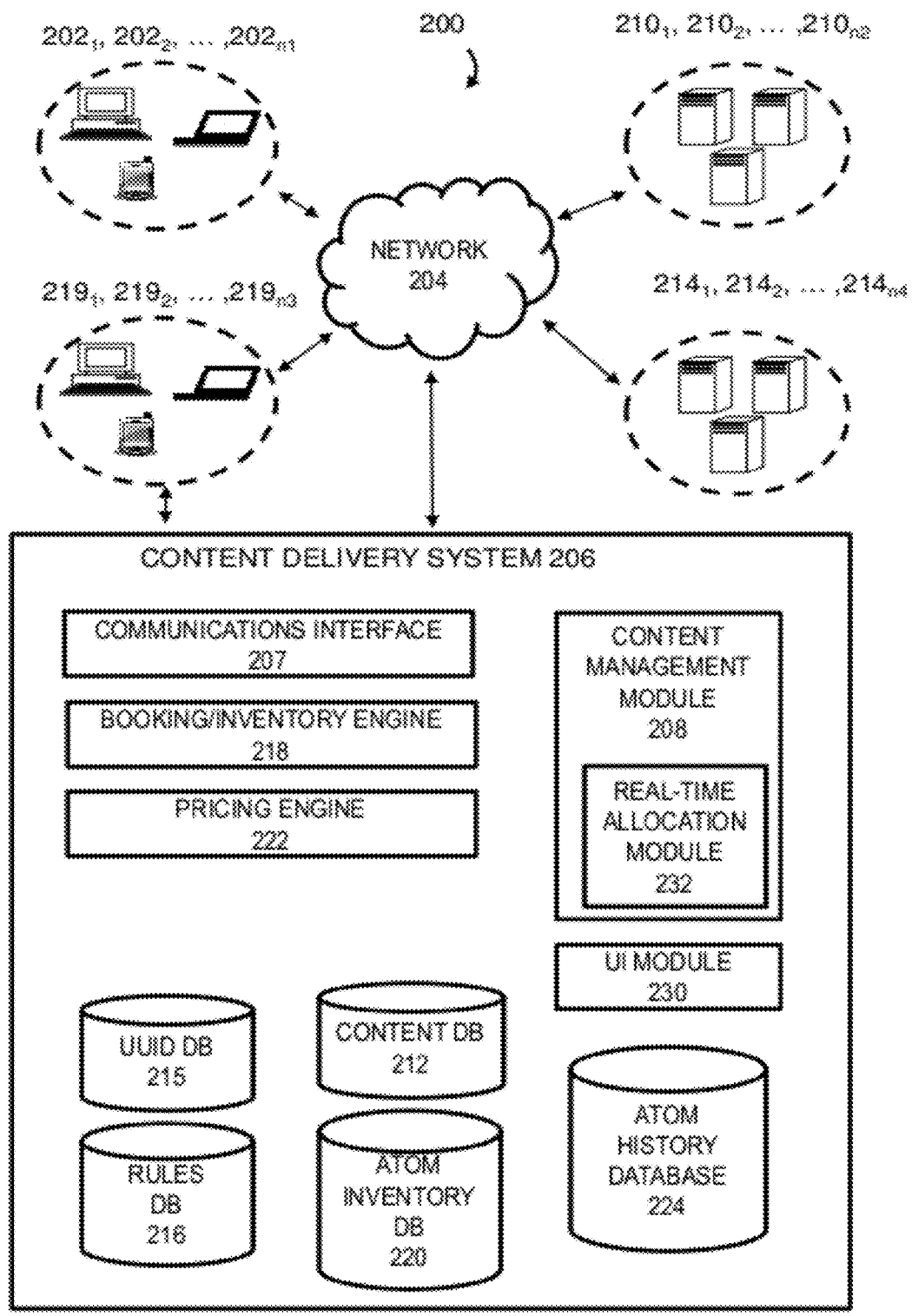
FIG. 2 illustrates an example system embodiment.

The present system and method is particularly useful for managing an inventory of atoms from one or more primary content providers for use by multiple content providers. A system 200 is illustrated in FIG. 2 wherein electronic devices communicate via a network for purposes of exchanging content and other data. In some embodiments, the present system and method are carried out on a local area network such as that illustrated in FIG. 2. However, the present principles are applicable to a wide variety of network configurations that facilitate the intercommunication of electronic devices.

In system 200, content packages are delivered to user terminals $202_1 \ldots 202_{n1}$ (collectively "202") connected to a network 204 by direct and/or indirect communications with a content delivery system 206. In particular, the content delivery system 206 receives a request for an electronic content, such as a web page, from one of user terminals 202. Thereafter, the content delivery system 206 assembles a content package in response to the request and transmits the assembled content package to the requesting one of user terminals 202. The content in the assembled content package can include text, graphics, audio, video, or any combination thereof. Further, the assembled content packages can include content designed to elicit a pre-defined response from the user and content that can vary over time. For example, the assembled content package can include one or more type of advertisements from one or more advertisers. The content delivery system can include a communications interface 207 to facilitate communications with the user terminals 202 and any other components in system 200.

The content delivery system 206 includes a content management module 208 that facilitates generation of the assembled content package that includes time-varying content, such as an advertisement. Specifically, the content management module can combine content from one or more primary content providers $210_1 \ldots 210_{n2}$ (collectively "210")

and content from one or more secondary content providers $214_1 \ldots 214_{n3}$ (collectively "214") to generate the assembled content package for the user terminals 202. For example, in the case of a web page being delivered to a requesting one of user terminals 202, the content management module 208 can assemble a content package by requesting the data for the web page from one of the primary content providers 210 maintaining the web page. For the time varying content on the web page provided by the secondary content providers 214, the content management module 208 can request the appropriate data according to the arrangement between the primary and secondary content providers 210 and 214.

Although, primary and secondary providers 210, 214 are presented herein as separate entities, this is for illustrative purposes only. In some cases, the primary and secondary providers 210, 214 can be the same entity. Thus, a single entity may define and provide both the static and the time-varying content.

In some embodiments, the content management module 208 can be configured to request that the data be sent directly from content providers 210 and 214. In other embodiments a cached arrangement can also be used to improve performance of the content delivery system 206 and improve overall user experience. That is, the content delivery system 206 can include a content database 212 for locally storing or caching content maintained by content providers 210 and 214. The data in the content database 212 can be refreshed or updated on a regular basis to ensure that the content in the database 212 is up to date at the time of a request from a user terminal. However, in some cases, the content management module 208 can be configured to retrieve data directly from content providers 210 and 214 if the metadata associated with the data in content database 212 appears to be outdated or corrupted.

In the various embodiments, the one or more databases described herein can be implemented using any type of data structures. Such data structures include, but are not limited to, data structures for relational databases, key/value stores, graph databases, hierarchical databases, and distributed or columnar stores. Accordingly, although the various embodiments described herein may refer to specific data structures in some embodiments, in other embodiments such data structures can be substituted for any other type of database structure.

In the various embodiments, the content delivery 206 can also include a unique user identifier (UUID) database 215 that can be used for managing sessions with the various user terminal devices 202. The UUID database 215 can be used with a variety of session management techniques. For example, the content delivery system 206 can implement an HTTP cookie or other conventional session management methods (e.g., IP address tracking, URL query strings, hidden form fields, window name tracking, authentication methods, and local shared objects) for user terminals 202 connected to content delivery system 206 via a substantially persistent network session. However, other methods can be used as well. For example, in the case of mobile devices or other types of user terminals connecting using multiple or non-persistent network sessions, multiple requests for content from such devices may be assigned to a same entry in the UUID database 215. Such an assignment can be provided by analyzing requesting device attributes in order to determine whether such requests can be attribute to a same device. Such attributes can include device or group-specific attributes.

As described above, content maintained by the content providers 210 and 214 can be combined according a pre-defined arrangement between the two content providers, which can be embodied as a set of rules. In an arrangement where the content delivery system assembles the content package from multiple content providers, these rules can be stored in a rules database 216 in content delivery system 206 and content management module 208 can be configured to assemble the content package for user terminals 202 based on these rules. The rules can specify how to select content from secondary content providers 214 and the primary content providers 210 in response to a request from one of user terminals 202. For example, in the case of a web page maintained by one of primary providers 210 and including variable advertisement portions, the rules database 216 can specify rules for selecting one of the secondary providers 214. The rules can also specify how to select specific content from the selected one of secondary providers 214 to be combined with the content provided by one of primary providers 210. Once assembled, the assembled content package can be sent to a requesting one of user terminals. However, the content package is not limited to the content from content providers 210 and 214. Rather, the content package can include other data generated at the content delivery system 206.

In most content delivery environments, such as that of system 200, the number and type of providers 210 and 214 are generally not static. For example, the number of primary content providers 210 and the amount and type of space they provide for second content providers 214 can vary over time. Further, the number of secondary content providers 214 can vary over time, as well as the amount and types of space they require from primary content providers 210. Further, the types of user and user terminals of interest to the secondary content providers 214 can also vary over time. As a result, directly specifying and/or adjusting arrangements between the content providers 210 and 214 can quickly become complicated in such a dynamic environment.

The various embodiments therefore provide systems and methods for processing requests for electronic campaigns and managing active electronic campaigns in such dynamic environments. A first aspect of the present technology provides systems and methods for planning and booking of electronic advertisement campaigns in response to campaign requests from secondary content providers. A second aspect of the present technology provides systems and methods for real-time allocation of advertising space for multiple active campaigns in a dynamic environment.

In the various embodiments, the content space provided by primary content providers 210 is managed as an inventory or collection of atoms defining an inventory space or region in a k-dimensional space of atoms, where each of the k dimensions is associated with one of a plurality of traffic segment characteristics. In the various embodiments, the k dimensions can include both orthogonal and non-orthogonal dimensions. That is, some of the k dimensions can overlap or can be related in some aspect. For example, if separate dimensions are specified for city and state, these dimensions are non-orthogonal. Each atom represents a portion of traffic associated with a specific set of values for the traffic segment characteristics in the k-dimensional space. For example, an atom can represent a fixed number of impressions for a particular segment. The inventory space will consist of one or more portions of the k-dimensional space depending on the segment characteristics associated with the content space available from the primary content providers 210. Accordingly the content delivery system 206 can manage an electronic campaign for one or more secondary content providers 214 based on the one or more segment characteristics of interest to each of the secondary content providers 214. This is conceptually illustrated in FIG. 3.

Figure 3:
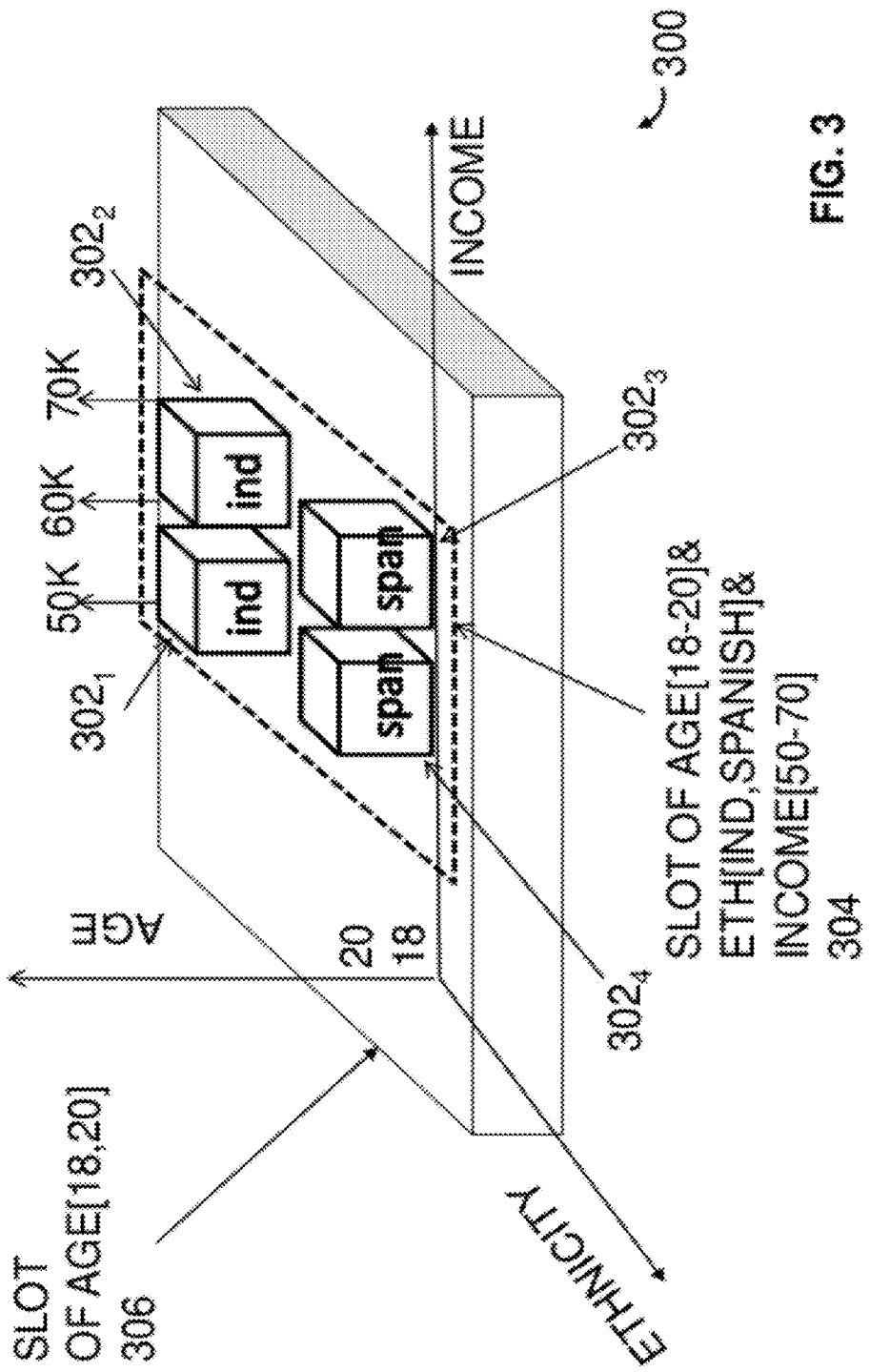
FIG. 3 is a schematic diagram of a inventory space.

FIG. 3 is a schematic diagram of an inventory space 300. As shown in FIG. 3, the space 300 is defined by demographic characteristics, specifically age, income, and ethnicity. Thus, each atom in space 300 is associated with an amount of traffic, a specific ethnicity, a specific age or age group, and a specific income or income group. For example, each of atoms $302_1$, $302_2$, $302_3$, and $302_4$ (collectively 302) is an amount of traffic (e.g., n impressions) associated with one of a Spanish or Indian ethnicity, one of a $50,000-$60,000 or a $60,000-$70,000 income bracket, an age range between 18 and 20. Thus, one of secondary content providers 214 wishing to deliver n impressions to Spanish and Indian users aged between 18 and 20 and having an income between $50,000 and $70,000, would request to reserve or book a slot 304 consisting of atoms 302. However, a larger slot of atoms could also be specified, such as slot 306 consisting of all atoms associated with users aged 18-20.

Although the space 300 in FIG. 3 is defined in terms of a few demographic segment characteristics, other segment characteristics can also be used. For example, an inventory space can include channel characteristics, spatial-temporal characteristics, behavioral characteristics, and demographic characteristics, to name a few. Channel characteristics can define the specific delivery channel being used to deliver a content package. For example, channel characteristics can include a type of electronic content, a type of device or user terminal, a carrier or network provider, or any other characteristic that defines a specific delivery channel for the content. Spatial-temporal characteristics can define a location, a date, a time, or any other characteristic that defines a geographic location and/or a time for delivery of the content. Demographic characteristics can define characteristics of the users targeted by the content or associated with the content. For example, demographic characteristics can include age, income, and ethnicity, as shown in FIG. 3, but can also include other demographic characteristics such as gender, occupation, or any other user characteristics. Behavioral characteristics can define user behaviors for one or more different types of content, separately or in combination with any other contextual characteristics. That is, different behavioral characteristics may be associated with different channel, demographic, or spatial temporal characteristics. For example, users may be associated with higher conversion or response rates for some types of delivery channels.

One aspect of the present technology is the use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, or any other identifying information.

The present disclosure recognizes that the use of such personal information data in the present technology can be used to the benefit of users. For example, the personal information data can be used to better understand user behavior, facilitate and measure the effectiveness of advertisements, applications, and delivered content. Accordingly, use of such personal information data enables calculated control of the delivered content. For example, the system can reduce the number of times a user receives a given ad or other content and can thereby select and deliver content that is more meaningful to users. Such changes in system behavior improve the user experience. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can configure their devices or user terminals to prevent storage or use of cookies and other objects from which personal information data can be discerned. The present disclosure also contemplates that other methods or technologies may exist for blocking access to their personal information data.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

In FIG. 3, the atoms 302 are shown as defining the entire traffic for each combination of segment characteristics for purposes of illustration only. In the various embodiments, any number of atoms, each defining an amount of traffic, can be specified for each combination of segment characteristics. For example, referring to the example in FIG. 3 above, each of atoms 302 can represent a collection of m sub-atoms, such that each of the m sub-atoms represents an amount of the total traffic for the combination of segment characteristics. In the case of the n impressions described above for atoms 302, the m sub-atoms for each of atoms 302 can be each associated with an amount of n/m impressions. Alternatively, the atoms 302 can be managed as being partially booked. In such configurations, as inventory slots are fulfilled, the metadata indicates each of the inventory slots it is associated with and the amount of traffic for each of the slots.

In FIG. 3, the inventory space 300 is shown as being continuous. However, in the various embodiments, an inventory space of inventory atoms can be continuous or discontinuous. For example, if a first primary content provider is associated with users with incomes between $25,000 and $50,000, a second primary content provider is associated with users with incomes between $70,000 and $100,000, and no other primary content providers are available, then the inventory space defined by these two primary content providers would exclude any atom associated with incomes between $50,000 and $70,000. As a result, the inventory space would be discontinuous. Although the above example discusses a single segment characteristic causing the discontinuity, in the various embodiments any number of segment characteristics can cause discontinuities in the inventory space.

It is also worth noting that although the above-mentioned examples are described in terms of the inventory atoms associated with the primary content providers 210, the inventory atoms defining the inventory space can be based on segment characteristics associated with other components or elements of system 200. For example, the primary content providers can have content and/or content space associated with segment characteristics in multiple dimensions and thus defines a first set of dimensions and segment characteristic values therein for the inventory space. However, the users and user terminal, based on their characteristics and behavior, can also be associated with segment characteristics in multiple dimensions. Thus, a second set of dimensions and values therein for the inventory space can be defined. Additionally, the content delivery system may be configured to consider with specific segment characteristics along multiple dimensions for the secondary content providers. Thus, a third set of dimensions and values therein for the inventory space can be defined. As a result, the inventory space is therefore defined by the atoms at the intersection of these different sets of dimensions and the values.

Referring back to FIG. 2, the content delivery system 206 can include a booking/pricing (B/I) engine 218 for receiving and processing campaign requests from users, in particular secondary content providers, i.e., advertisers, seeking to place their secondary content within the primary content being delivered to user terminals 202. In some embodiments, the campaign requests can be received from dedicated advertiser terminals $219_1, 219_2 \ldots 219_n$ (collectively 219) that are communicatively coupled, directly or indirectly (via network 204), to the content delivery system 206. In other embodiments, the campaign requests can be received from user terminals 202 or any other component in system 200.

The content delivery system 206 can also include an atom inventory database 220 that maintains a list or inventory of atoms from each of the primary content providers 210 and associated metadata. Thus, for each atom, the associated metadata can specify a source of the atom (e.g., the associated primary content provider) and any other segment characteristics associated with the atom. For example, the associated metadata can specify a status of the atom (i.e., available, unavailable, and/or an amount of traffic available), a secondary content provider who has already booked traffic of the atom, and other information related to the request that resulted in booking of traffic of the atom, such as the request associated with the booking of the slot. In some embodiments, the atom inventory database 220 can be organized in a tree-type structure. That is, each dimension is used to define a level of the tree structure. For example, in a tree structure based on the target user terminals, a root level can be split off into one or more manufacturers. The manufacturers can then be split off by model or family. The models or families can then be further split off in a similar manner until a final level, which specifies the atom and the atom metadata is reached.

The content delivery system 206 can further include an atom history database 224. The atom history database 224 can be used to maintain a record of the past use and performance of the atoms in the inventory space being managed by the content delivery system. For example, for each atom in the inventory space, the atom history database can maintain an allocation record. That is, a record of how the atom has been allocated in the past can be maintained. Such a record can not only identify the various campaigns that the atoms have been associated with, but can also maintain metadata for these previously associated campaigns. For example, metadata can include data indicating the type of campaign, the type of inventory slots, and identifying information for the secondary content provider, to name a few. Other types of metadata can also be stored. In addition to allocation record, the atom history database can also be configured to maintain a performance history of the various atoms. That is, for each atom, information regarding conversions and other events can be recorded. Additionally, this performance information can be recorded as a function of secondary content providers, campaigns, or type of conversion or event.

In the various embodiments a booking operation in system 200 generally works as follows. First, B/I engine 218 receives a campaign request from one of advertiser terminals 219 or any other user interface in system 200. The campaign request can define a least one inventory slot, i.e. segment characteristics, and a target objective (e.g., a performance objective and a cost objective) for the target slot. In response to this request, the B/I engine 218 interacts with the content delivery system 206 and a user to assemble and add a campaign for content delivery system 206. This process is further described with respect to FIG. 4.

Figure 4:
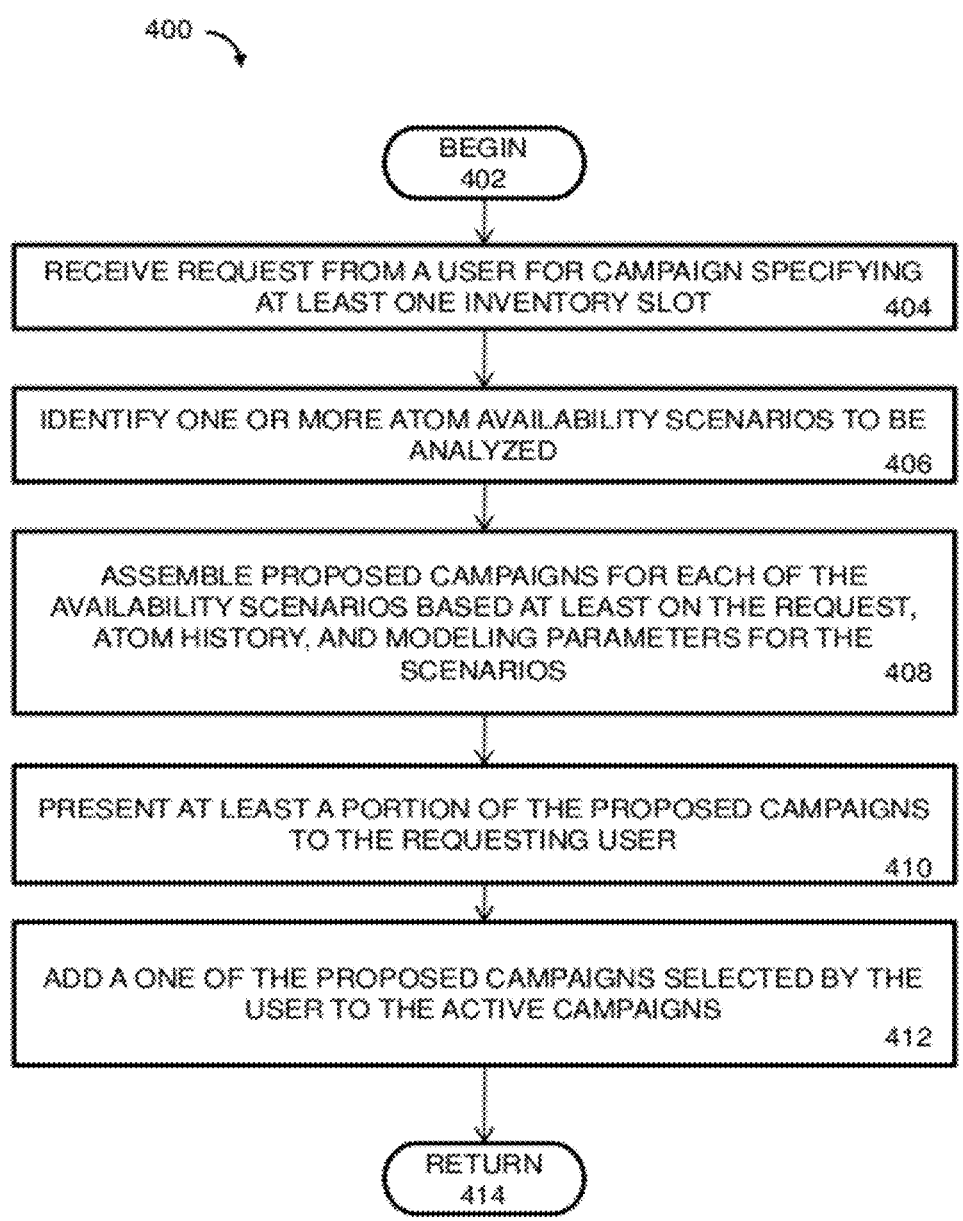
FIG. 4 is a flowchart of steps in an exemplary method for processing campaign requests.

FIG. 4 is a flowchart of steps in an exemplary method 400 for processing campaign requests. Method 400 begins at step 402 and continues on to step 404. At step 404, a campaign request is received from a user at the B/I engine 218. The request, as described above, can be received from one or advertiser terminals 219 or any other user interface communicatively coupled to the B/I engine 218.

As described above, the request can specify an inventory slot(s) and a target objective(s) for the slot. The target objective can be expressed in several ways. For example, the request can simply specify a maximum budget not to be exceeded. In another example, the request can specify a mean or median value for the atoms to be included in the booked slot. In yet another example, the request can specify a budget that varies based on one or more segment characteristics. That is, different cost objectives can be specified for atoms associated with different segment characteristics. Additionally, other types of cost objectives can also be used. For example, these can include performance metrics, such as a minimum click-through rate (CTR), an effective cost per thousand impressions (eCPM), a target conversion rate, and a target fill rate, to name a few. Further, any combination of target objectives can be used in the present technology.

Furthermore, the request can also specify match criteria for the segment characteristics in the request. That is, for at least one of the segment characteristics in the request, the request can also include acceptable variations in the segment characteristics. For example, the request can specify a segment characteristic specifying a location in the city of San Francisco and match criteria specifying any location in northern California. Such match criteria can be subsequently used to provide alternative atoms in response to a request, as described in further detail below. Similarly, match criteria with respect to performance, budget, or any other criteria or objectives for the campaign can also be specified in the request.

In some embodiments, match criteria for the requested inventory atoms, cost objectives, performance objective, or any other values defining the requested inventory slot can be provided via various precision values (ranging on a scale between 0 and 1). A precision values can also be attached to each of the values in the request or can be set globally for the request. The precision values can allow the user to relax or tighten the precision of the match. For example, an advertiser can select a precision of 1 (100%) with respect to the age group 18 to 24, but can select a lower precision, such as 0.5 (50%) with respect to the income group $120,000 to $150,000. Accordingly, while only atoms associated with ages 18-24 will be selected due to the 100% precision required, the 50% precision for income will allow inventory atoms outside the income group $120,000 to $150,000 to be selected. This can be especially useful in cases where desired exact match inventory is not available in the desired amounts. In some cases, the precision is applied only if inventory atoms meeting the requested atoms are not found. In other cases, the relaxed precision can be used from the beginning. In such configurations, the number of atoms selected that are outside the requested range can be limited to ensure that at least a minimum number of inventory atoms inside the requested range are selected.

After the request is received at step 404, availability scenarios for the requested campaign to be analyzed can be identified at step 406. That is, although the availability of atoms can be projected based on past performance and allocation of the atoms and known allocations and reservations of atoms in the future, such projections are typically based on the assumption that the environment in system 200 is static. Consequently, if changes occur that affect the inventory space, such projections will be inaccurate. Therefore, the scenarios identified at step 406 can be associated with scenario modeling parameters that specify possible scenarios of changes in atom availability.

The scenario modeling parameters specify an effect of atom availability based on changes in the environment of system 200. Specifically, these scenario modeling parameters can be used to project changes in supply, demand, and cost of atoms in the inventory space. For example, the scenario modeling parameters can be used to model the effect of changes to the number of primary content providers 210, the number of secondary content providers 214, the number of user terminals 202, and the amount of content space on the inventory space, to name a few. However, the scenario modeling parameters can be used to model the effect of any change in the environment of system 200 that leads to present and future changes in the inventory space.

In the various embodiments, the scenario modeling parameters can be specified using various sources. Further, any combination of scenario modeling parameters can be used to specify an availability scenario. In some instances, the scenario modeling parameters can be specified or generated based on information provided by primary content providers 210, secondary content providers 214, the content delivery system 206, or other entities. For example, scenario modeling parameters can be generated based on information regarding market trends, known changes in the marketplace, or any other information which may lead to changes in supply, demand, or costs of atoms.

In some embodiments, the scenario model parameters are used to operate a scenario modeling module of the B/I engine 218. In operation, this scenario modeling module utilizes a series of mathematical models for specifying all relevant parameters affecting inventory availability, at various states, along with interactions between sets of them, in the form of equations. As described above, these models can take into consideration multiple parameters affecting the ad inventory ecosystem. For example, with respect to advertiser demands, the models can be configured to account for the number and quantity of inventory requested by advertisers, as well as unforeseen but probable sudden increases or drops in this demand. With respect to inventory supply, the models can be configured to estimate site or application sign-up growth rates, estimate audience usage rates of these sites and applications, and/or estimate site or application importance ranking as suggested by the amount of users that download or use them. With respect to cost, the models can be configured to estimate multiple pricing points that can exist in relation to supply-demand curves. For example, atoms that are less available, in higher demand, and/or are more highly ranked with respect to performance can be priced automatically higher in comparison to atoms with similar segment characteristics, but that are in less demand, have a higher availability, and/or have a lower rank with respect to performance). In addition, the models can be configured to account for multiple bulk discount models that may exist between content providers in exclusive partnerships.

Although the models described above can be applied at all time, they can also be applied selectively. That is, different models can be made active whenever sets of thresholds or criteria are satisfied. For example, whenever the publisher supply drops more than 2 percent points in combination with supply increasing with at least 10 percent points this can trigger discontinuing user of a baseline model and using a different model to account for the different scenario. In such configurations, the thresholds can be specified in the scenario modeling parameter database or rules database.

In some embodiments, a manual, user-driven model can also be generated. For example, rather than relying on the automatic selection of models to be applied, a user can input the models to be used. Such a configuration is advantageous in that it allows users manually adjusting scenarios based on human experience and/or knowledge of future events that will affect availability. This can allow adjustment of models to account for variations in atom inventory that cannot be predicted by the supplied models alone. Further, such a configuration allows additional types of models to be implemented without the need for updating or upgrading the B/I engine 218.

In other instances, the scenario modeling parameters can be specified in the campaign request received at step 404. That is, the advertiser may have knowledge of certain information that will affect supply, demand, or costs of atoms. Alternatively, the advertiser may be concerned with potential changes in supply, demand, or costs of atoms. Accordingly, parameters reflecting such concerns can be provided by the advertiser.

It is worth noting that the advertiser can elect to specify a single scenario or interact with the B/I engine 218 such that only a single scenario is analyzed. That is, a single set of scenario modeling parameters are used. As a result, a single scenario would be identified at step 406. Alternatively, the advertiser can elect to interact with the B/I engine 218 such that no scenario modeling parameters are considered. In such circumstances, a single de facto scenario results and can be identified at step 406.

Once the availability scenarios are identified at step 406, proposed campaigns for the campaign request can be generated or assembled at step 408. That is, a proposed campaign (i.e., a collection of atoms) can be generated for each scenario based on the history of the atoms in the inventory space, the scenario modeling parameters associated with the scenario, and the request itself. This is illustrated below with respect to FIG. 5.

Figure 5:
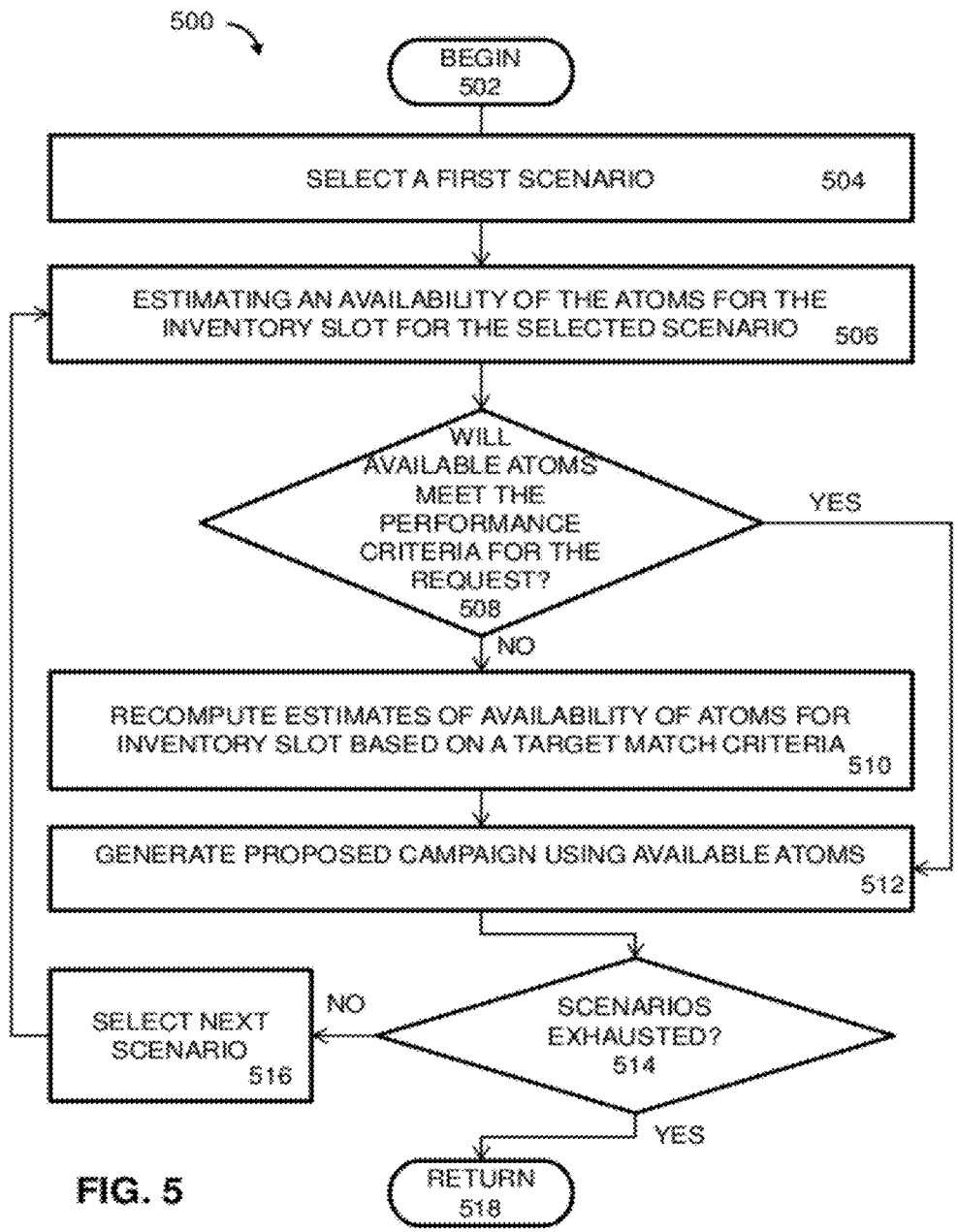
FIG. 5 is a flowchart of steps in an exemplary method for generating proposed campaign.

FIG. 5 is a flowchart of steps in an exemplary method 500 for generating proposed campaigns for different scenarios. Method 500 begins at step 502 and continues on to step 504. At step 504, a first of the scenarios is selected. Afterwards, an estimate of the availability of the atoms for the inventory slot specified in the campaign request is estimated for the selected scenario at step 506. That is, an adjusted estimated availability of the atoms in the inventory slot is generated. Such an estimate can take into account the past history of the inventory atoms, as well as known future unavailability of atoms, due to booked campaigns or reserved inventory atoms. Further, such an adjusted estimate can be generated in several ways. In some cases, the scenario modeling parameters can be used after a first estimate is obtained using the past history of the atoms. That is, the resulting projections or estimates of availability are adjusted based on the scenario modeling parameters. In other cases, the estimating process can incorporate the scenario modeling parameters. That is, scenario modeling parameters can be used together with the atom histories and future unavailability to directly obtain the estimates without the intermediate step of using the past history and future unavailability alone.

Thereafter, the availability estimate from step 506 is used to determine whether an inventory slot meeting the performance criteria specified in the request can be assembled. If atoms are available to provide an inventory slot meeting the performance criteria at step 508, the method proceeds to step 512. If not, the estimate is recomputed at step 510 using some match criteria to include atoms outside the requested inventory slot, but that would still be acceptable to the advertiser. Thereafter, at step 512, a proposed campaign is generated using the estimated available atoms. If an additional scenario needs to be analyzed at step 514, a next scenario is selected at step 516 and steps 504-514 are repeated. Once all scenarios have been analyzed at step 514, the method can end at step 518 and resume previous processing.

Referring back to FIG. 4, after the proposed campaigns are assembled at step 408, proposed campaigns can be presented to the requesting user at step 410. In some configurations, only some of proposed campaigns generated at step 408 are presented to the user. The campaigns to be presented can be selected in various ways. For example, the presented campaigns can be limited to those closest to meeting a performance criteria specified in the campaign request or some other criteria specified by the advertiser. Alternatively, the proposed campaigns can be limited to those associated with higher revenues for the primary content providers and/or greater margins for the content delivery system. Other selection methods or combinations thereof can also be used without limitation. In some cases, all the proposed campaigns can be presented to the requesting user at step 410. In such cases, a specific or random order can be used for presenting the proposed campaigns. In the case of a specific order, the order can be selected based on any criteria, such as that described above with respect to selecting a limited set of proposed campaigns. For example, the presented campaigns can be ordered according to how close to a matching of advertiser criteria occurs, an order of largest revenues and/or margins, and/or any other criteria, as described above.

In some embodiments, when the proposed inventory slots are presented to the advertiser at step 410, the atom inventory database 220 can be temporarily adjusted to indicate the unavailability of the atoms (or portions of the traffic therein) in the proposed inventory slots. Such a configuration prevents another request from another advertiser being fulfilled prior to review and acceptance of the proposed inventory slot by the first advertiser. For example, if an advertiser requests to book 1MM impressions for males 18-24 in San Francisco Bay area, the portion of the traffic of the atoms associated 1 MM impressions for males 18-24 in San Francisco Bay area can be "booked on hold" for 48 hours until the payment and final commitment is done. During this time, the available impressions for this particular atom combination and any overlapping dimensions are reduced at 1 MM impressions. For example, if the total available impressions prior to this hold for the atoms were 20 MM, the hold reduces the total available impressions for the atoms to 19 MM.

In some instances, the proposed inventory slots can have an expiration date or time for acceptance, after which the atoms are marked as available in the atom inventory database 220. Thus, if a hold period expires in the example described above, the 1 MM impressions are added back to the total number of available impressions for the atom combination. In other instances, as supply and demand of some or all of the inventory atoms in the proposed inventory slots change, the price of the slots can also be adjusted prior to acceptance.

After the proposed campaigns are presented at step 410 and an advertiser selects one of the proposed campaigns, the method 400 can add the selected proposed campaign to the active campaigns being managed by the content delivery system 206 at step 412. For example, the rules database 216 can be updated to reflect the existence of the new active campaign and how the campaign is to be managed by the content delivery system 206. Further, the content database 212 can also be updated to cache the content for the selected campaign. Such updating can be performed, for example, by the B/I engine 218. However, the various embodiments are not limited in this regard and other components within or external to content delivery system 206 can also be configured to update rules database 216 and other components of content delivery 206 to indicate that the selected campaign is active. Once the campaign is added to the active campaigns at step 412, method 400 can end at step 414 and resume previous processing, including repeating method 400 for other campaign requests.

As described above, proposed campaigns are assembled by estimating an availability of atoms for each scenario. That is, for each scenario, the B/I engine 218 finds the atoms associated with the request and retrieves an availability of these atoms. Additionally, because the advertiser will specify cost criteria (i.e., a budget) for the request, a cost for the traffic requested in each atom in the target inventory slot is also obtained. The traffic costs can be stored in atom inventory database 220 or calculated using a pricing engine 222 and an atom history database 224, as described in further detail below. Thereafter, the B/I engine 218 can assemble a proposed inventory slot for the advertiser, defining the atoms that meet the advertiser's cost objective and the total cost for the proposed inventory slot, plus any other criteria for the scenario. This process is described below in greater detail with respect to FIG. 6.

Figure 6:
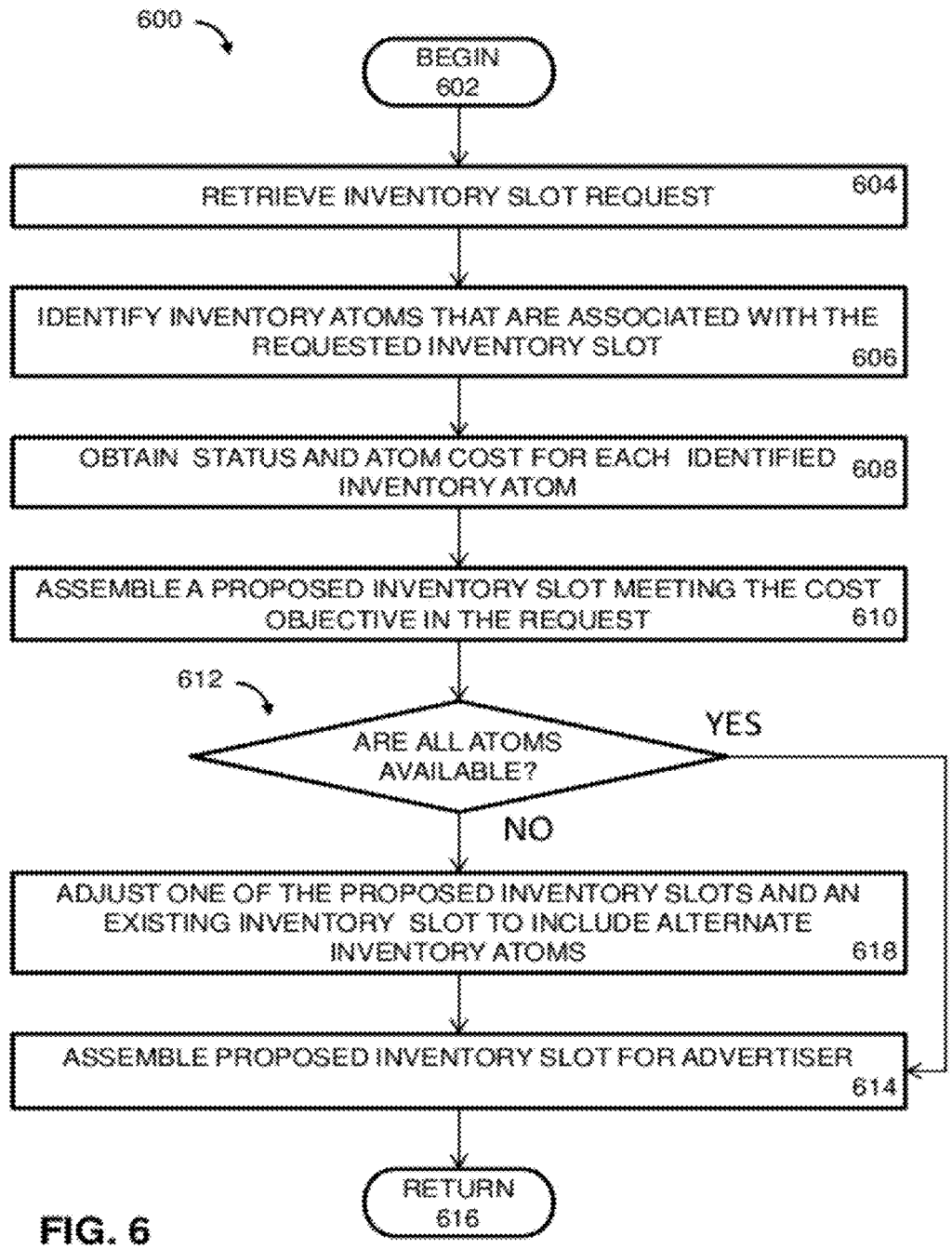
FIG. 6 is a flowchart of steps in an exemplary method for estimating the availability of inventory atoms.

FIG. 6 is a flowchart of steps in an exemplary method 600 for estimating the availability of inventory atoms. Method 600 begins at step 602 and continues to step 604. At step 604, an inventory slot request is retrieved. For example, an inventory slot request for a scenario associated with a campaign request. In the various embodiments, the inventory slot request includes at least one segment characteristic of interest to the advertiser or secondary content provider. For example, as described above with respect to FIG. 3, the exemplary request therein specified an age range, an income range, and/or ethic groups of interest.

Additionally, the request can also specify a target objective for the slot. The objective can be expressed in several ways. For example, the request can simply specify a maximum budget not to be exceeded. In another example, the request can specify a mean or median value for the atoms to be included in the booked slot. In yet another example, the request can specify a budget that varies based on one or more segment characteristics. That is, different cost objectives can be specified for atoms associated with different segment characteristics. Additionally, other types of cost objectives can also be used. For example, these can include performance metrics, such as a minimum click-through rate (CTR), an effective cost per thousand impressions (eCPM), a target conversion rate, and a target fill rate, to name a few.

As described above, the request can also specify match criteria for the segment characteristics in the request. That is, for at least one of the segment characteristics in the request, the request can also include acceptable variations in the segment characteristics. For example, the request can specify a segment characteristic specifying a location in the city of San Francisco and match criteria specifying any location in northern California. Such match criteria can be subsequently used to provide alternative atoms in response to a request, as described in further detail below. As also described above, the match criteria can also specify allowable variations in cost, performance, or any other aspect of the campaign request.

Once the request is retrieved by the content delivery system 206 at step 604, the request is forwarded to the B/I engine 218 for subsequent processing at step 606. At step 606, the B/I engine 218 identifies the atoms in the atom inventory database associated with the target inventory slot.

The identification of available atoms can be performed in several ways, depending on the data structure of the atom inventory database 220. For example, a lookup operation can be used for table-based database and a tree scanning operation can be used for tree-type database. However, any other methods can be used.

For example, in some embodiments, a Locality Sensitive Hashing (LSH) technique can be used in conjunction with forecasting techniques to generate the inventory of available atoms in the atom inventory database. In such a technique, a data preparation step is provided in which the data is first filtered for the contextual characteristics of interest, such as a specific date or dates. The filtered data consists of performance data for previously delivered content with respect to various contexts or segments, metadata for the content, and information identifying the request. Thereafter the impressions for a given atom are serialized based on the date(s). Following the data preparation, super atoms are created by using an LSH from the filtered atoms. The super cells are a mapping from the existing inventory space to a similar space preserving the isomorphic properties of their topological space. That is, a homomorphic mapping done with an intent to reduce dimensionality and also compute stable estimations. These two topological spaces are termed equivalent, and hence has a continuous function with a continuous inverse. The LSH hashing used here can be selected to limit the amount of computational complexity yet still provide an adequate data set for projecting information back to the original inventory atoms. Further, the aggregation of cells (done by hashing) is selected to limit the over averaging and hence cause incorrect estimation. The LSH is applied only on dimensions which has ordinal values in it.

In many cases, the factor affecting the dimensionality of atoms for a mobile device, such as a mobile telephone, is geographic information. For example, such geographic information can include a home location and a current location. In such cases, a hashing is provided to map a current location into its corresponding DMA and use it as the hash for the geographic dimension(s). Thus, the dimensionality and the stability of the estimation can be evaluated by first applying LSH on the geographic dimension. Further aggregation is then provided only if required. This method is not limited to geographic information. Other cardinal dimensions on which LSH can be used to identify super atoms include hour of day, income group, day of week, and content rating.

The aggregated impressions for super cells can then be temporally serialized. That is, the temporal data is modeled as the regressor and the actual inventory is modeled as regressand. A design matrix can then be computed with the above-mentioned model with beta parameters as the effects or regression coefficients. The design matrix from the given dates and the actual impression are the values to be estimated. If it is assumed that the data is homoscedastic, and the variance is independent of any parameter, ordinary least squares methods can then be used to compute the effects. Thereafter, forecasting is performed by applying the date values to a matrix equation consisting of the design matrix and the effects. Thus, values are estimated that indicate an inventory for the super atoms. Finally, the estimated values are mapped back from its current topological space to its original space. That is, the forecast information associated with the super atoms is projected back the atoms in the inventory space. Such information can be projected in a variety of ways. For example, in some embodiments an equal or weighted proportion distribution strategy can be used. That is, the information is projected back according to the proportional distribution of the original atoms in the super atoms.

Although the LSH method described above provides an estimate of available traffic for the inventory atoms, an update step can be required prior to identification of available atoms at step 608. In particular, since the inventory space and the status of the inventory atoms therein can change dynamically, the status of the inventory atoms can be updated using existing campaign information. That is, the status of the inventory atoms can be checked versus the current commitments for inventory atoms. Accordingly, those inventory atoms, or portions thereof, already associated with active campaigns are marked as being unavailable. Thereafter, this updated inventory can then be used for estimating the availability of inventory atoms.

Afterwards, or concurrently with the identification of atoms at step 606, a cost and a status of the identified atoms can be obtained at step 608. A status of the identified atoms can be obtained from the status metadata associated with the identified atoms in the atom inventory database. This status data can include the current availability (e.g., available traffic) of the atom. However, the status information retrieved can also include other metadata. For example, the status data for unavailable or booked atoms can also include data identifying the slot and/or the request associated with the previous booking of these atoms. In another example, the metadata can include data associated with a past performance, such as a past click-through rate (CTR), an effective cost per thousand impressions (eCPM), a conversion rate, and a fill rate, to name a few.

A cost for booking the identified atoms can also be obtained in several ways. For some atoms, a rate card or table can be used to determine the cost. That is, a particular atom or a particular amount of traffic for an atom can be associated with a fixed cost. Thus, the cost can also be stored as part of the metadata in the atom inventory database 220 and can be retrieved along the status information. In other instances, atoms and/or atom traffic can be associated with a fixed base cost that is adjusted based on the segment characteristics. For example, a single base cost can be associated with a collection of atoms. However, an adjustment to the cost can be specified for at least some of these atoms. For example, an adjustment can be specified that increases the cost of atoms associated with more popular or desirable segment characteristics. Similarly, for atoms associated with unpopular or undesirable segment characteristics, an adjustment can be specified that decreases the cost of these atoms. Such adjustments can be determined a priori. However, such adjustments can be determined dynamically during operation of system 200. That is, new costs for atoms can be determined in real-time as a function of varying supply and demand for atoms and inventory slots, changes in content providers, and budgets.

Figure 7:
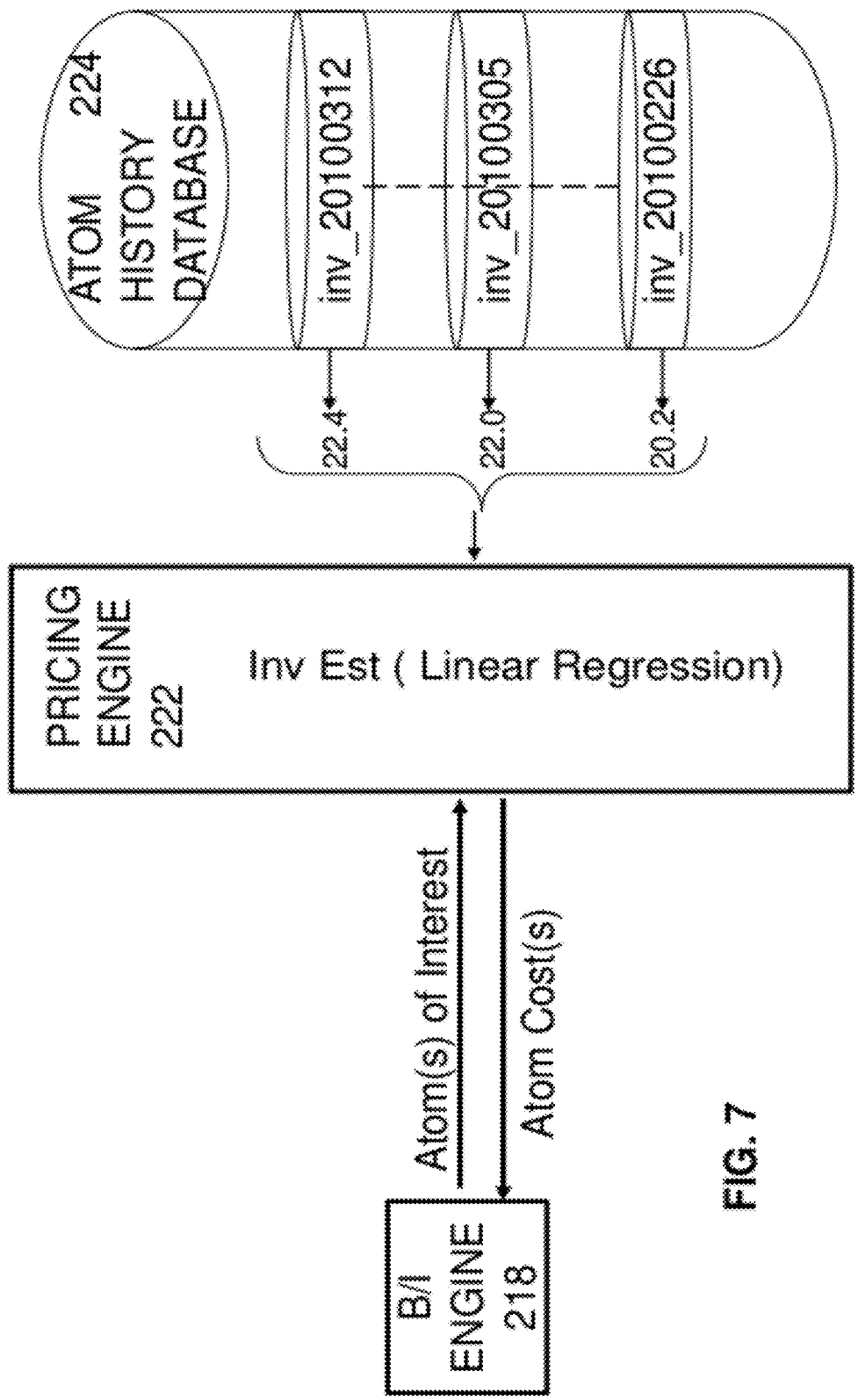
FIG. 7 is a schematic of an exemplary process for estimating future demand and cost for an atom(s) of interest.

In some instances, the costs associated with atoms can be market driven. That is, the performance history for the atom can be retrieved (such as from an atom history database 224) and a future performance for the atom can be projected. This is conceptually illustrated in FIG. 7. FIG. 7 is a schematic of an exemplary process for estimating future demand and cost for an atom(s) of interest. First, a desired group of atoms or an inventory slot of interest is provided to the pricing engine 222 from the B/I engine 218. Thereafter, the pricing engine 222 retrieves the use history of such atoms from the atom history database 224. For example, the pricing engine 222 can obtain data indicating the number of impressions for the atom(s) of interest. Once the impression data is retrieved, a future demand (i.e., a projected number of impressions) can be projected. For example, as shown in FIG. 7, a linear regression technique can be used with a past number of impressions at different times to project a future number of impressions that are likely to be obtained at the date and time associated with the atom(s) of interest. However, the various embodiments are not limited in this regard, Accordingly, future demand can be projected based on other algorithms, such as neural network methods, fuzzy/probabilistic methods, Bayesian methods, or tree-based greedy algorithm methods, to name a few.

Based on this projected number of impressions, the pricing engine 222 can then compute costs associated with booking the atom. Thus, if a higher number of impressions are expected, a lower cost can be provided, as a large supply of impressions is available. In contrast, if a lower number of impressions are expected, indicating a smaller supply of impressions, a higher cost can be provided. In some embodiments, a combination of fixed and market driven methods can be used to obtain costs for booking atoms. For example, while the base cost is fixed, an adjustment cost can be based on a projection of performance and/or demand.

As described above, one method of determining the number of inventory atoms available is to also use a projection-type method. Accordingly, in some embodiments, a projection can be used for both projecting the amount of available inventory and to determine atom costs.

Referring back to FIG. 6, once the status and associated costs for booking each inventory atom are obtained at step 608, a proposed inventory slot can be generated in response to the request at step 610. In particular, a collection of the atoms identified in step 606 can be assembled that meets the cost objective in the request. For example, if the cost objective specifies a mean or median atom cost as the cost objective, the resulting proposed inventory slot can be assembled by selecting a set of the identified inventory atoms that provides a mean or median atom cost that meets the cost objective. In another example, if the cost objective is a specific cost or cost range, the proposed inventory slot can be assembled by selecting a set of the identified inventory atoms such that their total cost meets the cost objective. Thus, a proposed inventory slot may or may not include all the identified atoms for the requested slot depending on the cost objective and/or performance objectives.

Ideally, if all the atoms are available at step 612, the proposed inventory slot for the advertiser is assembled at step 614. The method can then resume previous processing at step 616, including repeating method 600.

Figure 8:
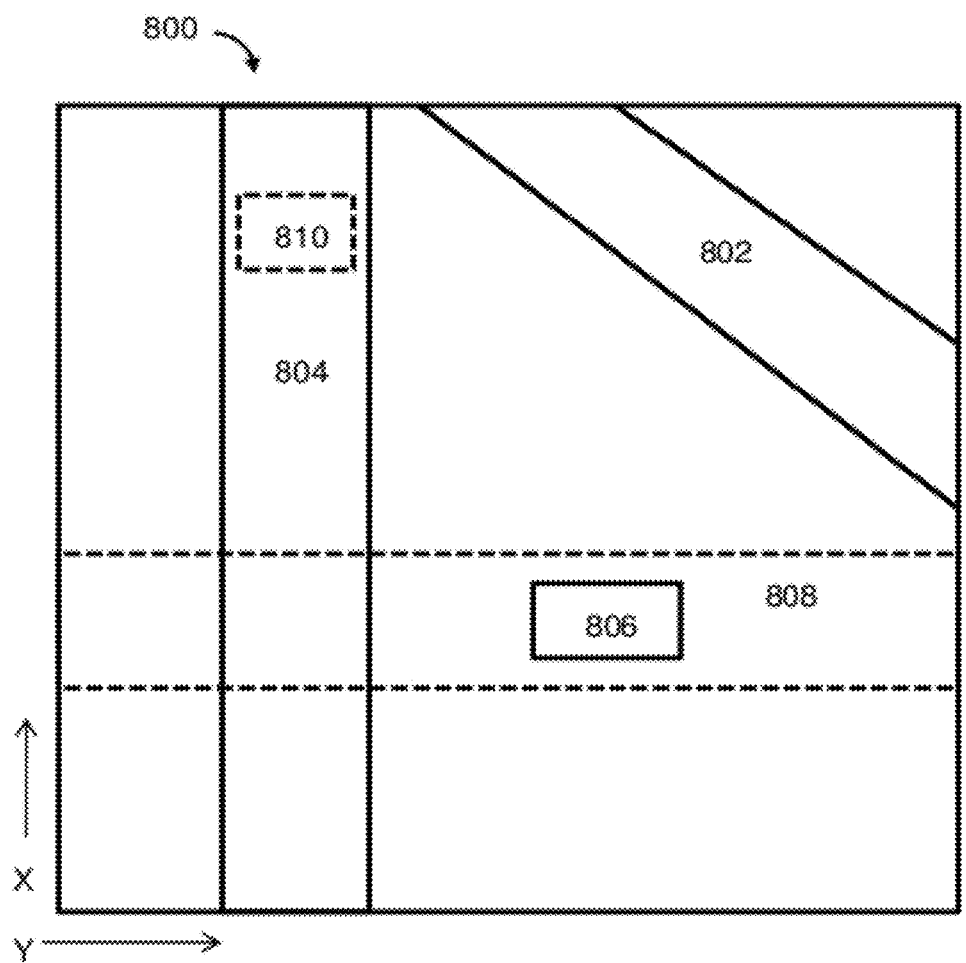
FIG. 8 is a schematic diagram showing possible conflicts or intersections between proposed and booked inventory slots in inventory space.

In some instances, it is possible that some of the atoms selected for the proposed inventory slot at step 610 will not be available (i.e., already booked for another slot) or will be only partially available (e.g., the remaining traffic in the atoms fails to meet the objective). For example, while the inventory atoms in a first portion of the proposed inventory slot may be fully available, inventory atoms in a second portion of the proposed inventory slot may be partially or completely unavailable. This is conceptually illustrated in FIG. 8. FIG. 8 is a schematic diagram showing possible conflicts or intersections between proposed and booked inventory slots in inventory space 800. Although an inventory space can include any number of dimensions associated with different segment or contextual characteristics, the inventory space 800 is shown as a two dimensional space with substantially rectangular slots for ease of illustration and explanation.

As shown in FIG. 8, inventory space 800 includes booked inventory slots 802, 804, and 806 (i.e., atoms already reserved for other campaigns or otherwise unavailable). FIG. 8 also shows proposed inventory slots 808 and 810. Ideally, to satisfy a request, it is desirable that the proposed slots not intersect or otherwise conflict with booked slots, such as in the case of slot 802 and slots 810 and 808. However, in some cases, the intersection or conflict may be unavoidable. For example, in the case of slot 804 and slot 808, the intersection of proposed slot 808 and slot 804 indicates that an entire portion of slot 808 along the Y dimension may be unavailable. That is, if insufficient traffic remains after slot 804 is booked, a conflict occurs. Similarly, the intersection of proposed slot 808 and slot 806 indicates that a portion of slot 808 along the Y dimension may be partially unavailable and the intersection of proposed slot 808 and slot 804 indicates the entire portion of slot 810 may be unavailable.

In the case of such conflicts, method 600 can instead proceed from step 612 to step 618. At step 618, the conflict between the proposed inventory slots and a booked slot(s) is resolved by adjusting one of these slots to utilize an alternate atom. This process is described below in greater detail with respect to FIG. 9. Thereafter, the proposed inventory slot (which may or may include alternate atoms) is assembled at step 614. The method can then resume previous processing at step 616, including repeating method 600.

Figure 9:
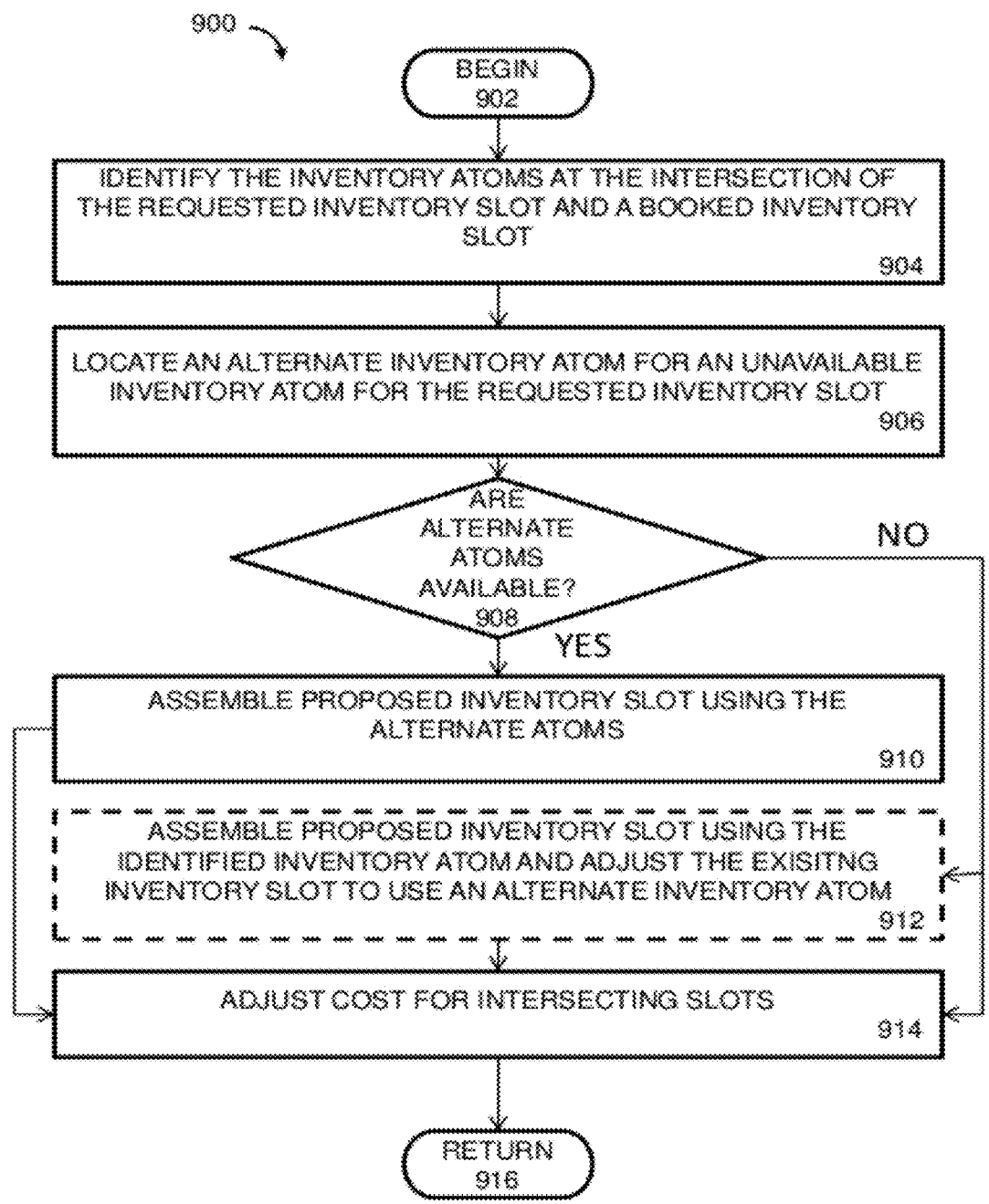
FIG. 9 is a flowchart of steps in an exemplary method for removing conflicts between overlapping slots.

As described above in FIG. 6, removal of conflicts between slots can be achieved by selecting alternate atoms to remove the conflict. An exemplary method for removing such conflicts is shown in FIG. 9. FIG. 9 is a flowchart of steps in an exemplary method 900 for removing conflicts between overlapping slots. Method 900 begins at step 902. At step 904, the atoms at the intersection of a requested inventory slot and a booked inventory slot are identified. Such identification can be based on the segment characteristics for each slot. For example, a third slot can be identified, having both the segment characteristics of the booked slot and the requested slot.

These atoms therefore define the intersection between the slots. Alternatively, comparison methods can be used to identify common atoms. Other methods can also be used to identify the intersection.

Once the atoms for the intersection at identified at step 904, alternate atoms can be located for the requested inventory slot at step 906. That is, the B/I engine 218 can identify other atoms that are currently available and that can be substituted for the intersecting atoms. For example, if atoms were not previously selected because a maximum budget was already spent, available ones of those atoms can be used as alternate atoms for the proposed inventory slot. In another example, a request can include match criteria for one or more of the segment characteristics, as described above. Accordingly, available atoms that correspond to the match criteria can be used as alternate atoms for the proposed inventory slot. Thus, alternate atoms are located that match, at least partially, the segment characteristics of the requested inventory slot.

In such embodiments, the B/I engine 218 can operate using a similarity/recommendation algorithm that analyzes the match criteria and recommends atoms meeting the match criteria and the target objective, when some of the inventory atoms in the requested inventory slot are booked or otherwise unavailable. Additionally, when no match criteria are available, the similarity/recommendation algorithm can also be configured to instead recommend similar atoms (in terms of cost and performance objectives) atoms.

Depending on the amount of booked atoms in the space and the match criteria specified in a request, alternate atoms may or may not be located for intersecting atoms in a requested inventory slot. If alternate atoms for the intersecting atoms of the requested inventory slot are found at step 908, a proposed inventory slot is assembled using the alternate atoms at step 910. However, if alternate atoms are not available for the requested inventory slot at step 908, method 900 can optionally proceed to step 912. At step 912, for each intersecting atom of the requested inventory slot not having an alternate atom, an alternate atom can instead be located for the booked inventory slot. Such atoms can be located in a similar manner as described above with respect to step 906. The requested inventory slot can then be fulfilled by assembling a proposed inventory slot that includes the intersecting atoms and the booked slot can be modified to include an alternate atom.

Following either of steps 910 or 912, method 900 then proceeds to step 914. At step 914, a cost for the intersecting slots can be adjusted. That is, if the proposed inventory slot or the booked inventory slot does not include all of the atoms originally requested, an alternate price can be provided. For example, a fixed discount can be provided. That is, the alternate atom is provided at the cost of the intersecting atom, but at a discounted price. However, in other cases, a discount may or may not be provided. For example, as described above, the cost for an atom can vary depending on several factors, such as the segment characteristics or a demand for the atom. Therefore, a combination of methods can be used to enhance revenue. For example, a fixed discount cost and an actual atom cost can be compared. A larger of the two costs can then be used for the alternate atom. In yet other cases, the cost for the intersecting atom can be adjusted. That is, since the intersection defines an increased demand for the atom, a premium cost can be associated with the atom. Thus, if such an atom is included in the proposed inventory slot, it cost can be increased. Once the adjustments at step 914 are completed, method 900 can proceed to step 916 and resume previous processing, including repeating method 900.

In some instances, it is possible that a conflict is unavoidable. Accordingly, in one embodiment where two separate inventory requests with multiple overlapping inventory atoms need to be fulfilled, the amount delivered can be deducted from each of their component atoms in proportion to their booking allocation. This can be done via a brute or projection/estimation method, for example. In the brute method, delivered impressions can be deducted from the two campaigns with overlapping atoms, by first computing a Cartesian product of all atoms and their cardinality, then deducting the micro-amounts from the individual atoms, then reflecting these deductions at aggregated levels. However, this can require substantial large computing requirements to perform such calculations in real-time. In the estimation method, a sampling procedure can be used. That is, performing estimation similar to that of the brute method, but on a subset of the complete atoms. Thereafter, the estimation is projected to the entirety of atoms based on this sampling. In another estimation method, a cross-product matrix of atom combinations and a measure of correlation between the atoms can be obtained. Thereafter available inventory atoms can be proportionally deducted from both sides of an overlapping set of atom tuples, based on these correlations between them. This method has the advantage that it does not require computing the full Cartesian product of all n-way combination of 2, 3, 4, . . . , n atoms each. Instead, this method estimates availability based on delivery/allocation of atoms in proportion to their distribution in the atom universe.

As described above, assembling and acceptance of proposed inventory slots by advertisers is a first aspect of the present technology. Another aspect of the present technology is how atoms from the inventory space are allocated to active campaigns in a dynamic environment. In a dynamic environment, it is possible (and likely) that the information available at the time of booking an inventory slot may be obsolete. Thus, the assumptions used to estimate inventory at the time of booking may no longer be valid. Accordingly, the present technology also provides for real-time allocation of inventory atoms for active campaigns that accounts for changes in the environment. This is described below with respect to FIG. 10.

Figure 10:
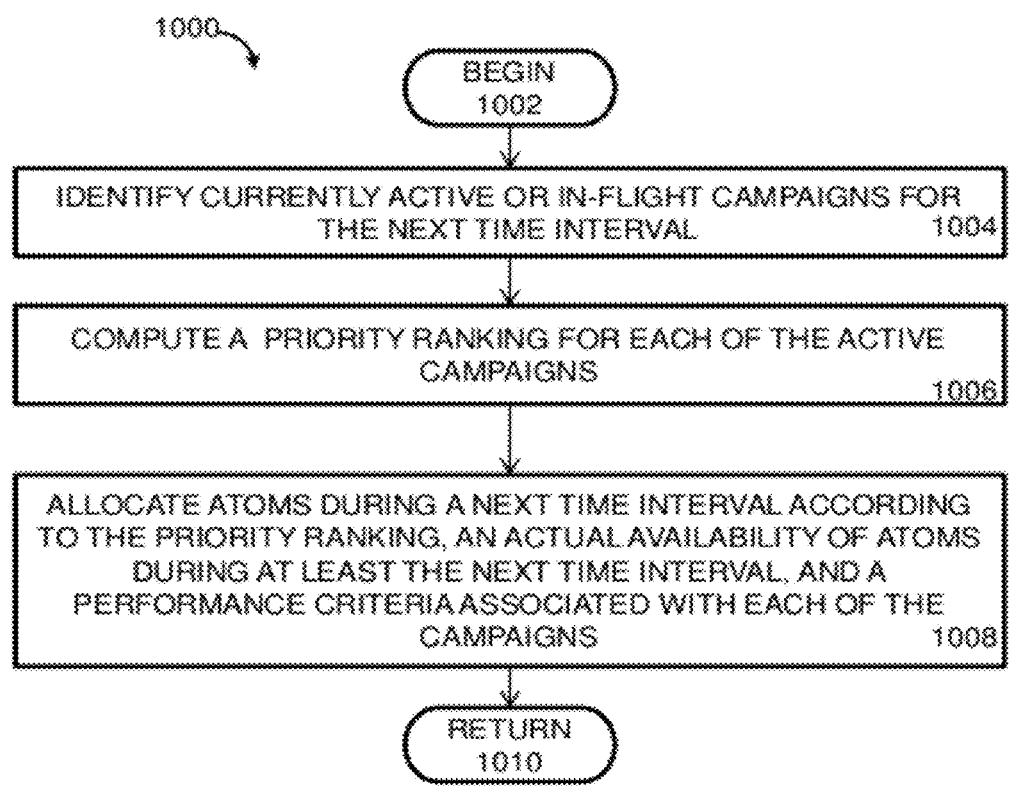
FIG. 10 is a flowchart of steps in an exemplary method for allocating atoms in real-time to active campaigns.

FIG. 10 is a flowchart of steps in an exemplary method 1000 for allocating atoms in real-time to active campaigns. Particularly, method 1000 illustrates allocation of inventory atoms for a next interval of time. Method 1000 begins at step 1002 and continues on to step 1004. At step 1004, campaigns that will be active or are in-flight during the next time interval for which atoms need to be allocated can be identified by the content management module 208. For example, in some embodiments, the content management module 208 can include a real-time allocation module 232 for accessing the rules database 216, the B/I engine 218, or any other component of the content delivery system maintaining a listing, database, or other data structures that directly or indirectly identify the currently active campaigns being managed by content delivery system.

Once the active campaigns are identified at step 1004, a priority ranking for each of the campaigns can be computed at step 1006. The priority ranking can be based on information specified in the original campaign request, information provided during the booking process, or any other information associated with the active campaigns. In the various embodiments, the priority ranking indicates an atom allocation priority for the various active campaigns. That is, the order in which atoms should be allocated to the various active campaigns during a next time interval. For example, if two active campaigns require atoms from a same group of atoms and the number of atoms in the group is less than that required for both active campaigns, the priority ranking is used to ensure that the atoms are allocated to fulfill the higher ranked campaign.

In the various embodiments, the priority ranking can be based on any number of factors. For example, the priority ranking can be based on a remaining time of the active campaigns. Thus, active campaigns with a shorter amount of remaining campaign time can have a higher priority. In another example, active campaigns associated with a more targeted set of atoms can have a higher priority than active campaigns associated with a less targeted or a generic set of atoms. Thus, an active campaign targeting users in San Francisco can have a higher priority as compared to an active campaign targeting users in California. In yet another example, some advertisers or campaigns can be associated with a higher priority during the booking process. That is, such advertisers or campaigns can be identified as "preferred" in the content delivery system. Thus, active campaigns associated with preferred advertisers or preferred active campaigns would have a higher priority than active campaigns associated with other advertisers or other active campaigns. The priority ranking can also be based on other factors not listed above and/or a combination of factors. For example, a weighted or non-weighted combination of time remaining, atoms targeted, and advertiser preferences can be used to obtain the priority ranking. In another example, a performance-based priority can be used. That is, campaigns associated with inventory atoms that are estimated to have a higher cost or performance objective are given a higher priority. In yet another example, campaigns associated with inventory atoms that are estimated to provide a greater margin volume to the content provider, regardless of their performance.

Figure 11:
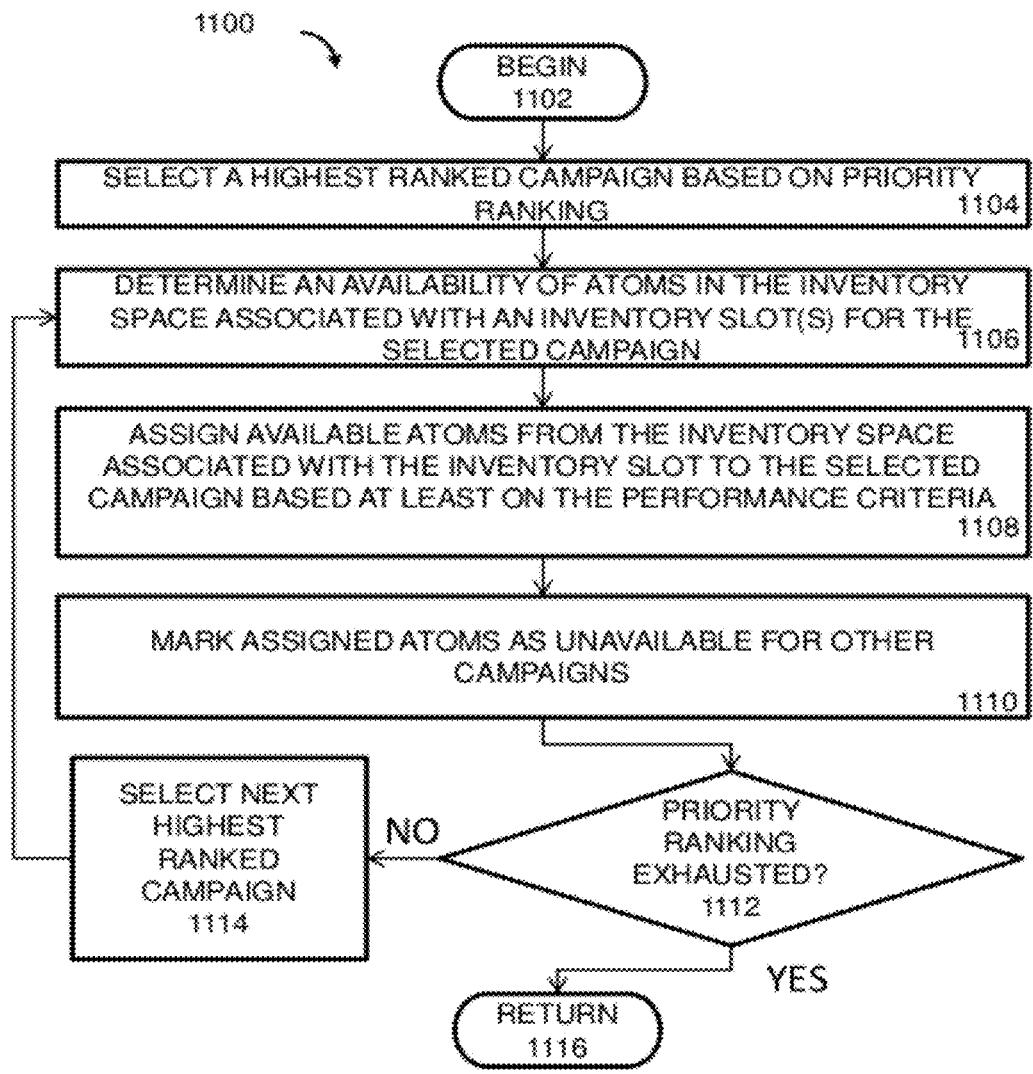
FIG. 11 is a flowchart of steps in an exemplary method for allocating atoms to active campaigns in a priority list.

After the priority ranking is obtained at step 1006, the atoms for the next time interval can then be allocated at step 1008. In particular, the atoms are allocated based at least on the priority ranking obtained at step 1006, the actual availability of atoms during the next time interval, and performance criteria for the campaigns. One exemplary process for the allocation at step 1008 is illustrated in FIG. 11. Thereafter, the method 1000 can resume previous processing at step 1010, including repeating method 1000 for subsequent time periods.

FIG. 11 is a flowchart of steps in an exemplary method 1100 for allocating atoms to active campaigns in a priority list. Method 1100 begins at step 1102 and continues to step 1104. At step 1104, the highest ranked active campaign is selected based on the priority ranking. Thereafter, at step 1106, the availability of atoms for the inventory slot for the selected campaign can be computed as previously described with respect to FIG. 6. This can include the selection of alternate atoms as described in FIG. 6.

Once the availability of atoms for the selected campaign is determined at step 1106, at least a portion of the available atoms can be assigned to the selected campaign at step 1108, based at least on the performance criteria. That is, the active campaign may be associated with criteria that limits the number of atoms that can be assigned to the active campaign during the next time interval. For example, the active campaign can have an interval cap that limits the number of impressions and/or the budget for a time interval. However, in some instances, other criteria can be used separately or in combination with the performance criteria. For example, in some embodiments, both the current and future availability of inventory atoms may be computed and analyzed. Thus, if the number of atoms available during subsequent time intervals will provide an insufficient number of impressions for the selected campaign, the interval cap for the selected campaign can be ignored and/or temporarily modified in order to ensure the total amount of impressions required for the campaign are provided. Thereafter, the assigned atoms are marked as unavailable at step 1110 for other active campaigns.

Once atoms are assigned and marked unavailable at steps 1108 and 1110, respectively, the priority ranking can be checked at step 1112 to see if any other active campaigns need to be processed. Thus, if the priority rank has not yet been exhausted at step 1112, a next higher ranked campaign is selected at step 1114. Thereafter, steps 1104-1112 can be repeated until the priority ranking is exhausted. Once the priority ranking is exhausted at step 112, the method 1100 can end and resume previous processing at step 1116, including repeating methods 1000 and 1100 for a subsequent time interval.

In the various embodiments, content delivery system 206 is configured to permit users to adjust the operation and configuration of the various components of content delivery system 206. For example, as described above, advertisers can interact with the content delivery system 206 to plan and book campaigns. Accordingly, a user interface can be provided for communicating with a user interface (UI) module 230 for performing such tasks. Further, the UI module 230 can be configured to provide different levels of access based on authenticating different types of users. For example, administrative users can utilize the user interface and UI module 230 for specifying and/or modifying information regarding the primary content providers 210, the secondary content providers 214, user terminals 202, and end users. Administrative users can also utilize the user interface and UI module 230 for specifying operating parameters for the various interfaces, modules, engines, or databases of content delivery system 206. Further, administrative users can also utilize the user interface and UI module 230 for manually or directly adjusting any of the entries in the databases of content delivery system 206.

In addition to providing access to administrative users, the user interface and UI module 230 can also be configured to provide access to end users associated with primary content providers 210 and end users associated with secondary content providers 214. In the case of end users associated with primary content providers 210, the user interface and UI module 230 can be configured to allow such end users to, for example, update existing content from primary content providers 210 with the content delivery system 206, register new content or new primary content providers with the content delivery system 206, and/or specify preferences for selecting content from secondary content providers 214. In another example, the user interface and UI module 230 can include analysis tools for evaluating performance of content from the primary content providers 210, such as the performance of content with respect to the user terminals and/or content from the secondary content providers 214. In the case of end users associated with secondary content providers 214, the user interface and UI module 230 can be configured to allow these end users to, for example, update existing content from secondary content providers 214 with the content delivery system 206, register new content or new secondary content providers with the content delivery system 206, or specify preferences for selecting primary content providers 210. In another example, the user interface and UI module 230 can include analysis tools for evaluating performance of content from the secondary content providers 214, such as the performance of content with respect to the user terminals 202 and/or content from the primary content providers 210.

In the various embodiments, the user interface for the UI module 230 can be accessed via an end user terminal in communication with the content delivery system 206. For example, the end user terminal can be one of user terminals 202, a user interface device associated with any of content providers 210 and 214, or any user interface device or system locally or remotely connected to content delivery system 206. The user interface and UI module 230 can be configured to operate in a variety of client modes, including a fat client mode, a thin client mode, or a hybrid client mode, depending on the storage and processing capabilities of the content delivery system 206 and/or the end user terminal. Therefore, a user interface for UI module 230 can be implemented as a standalone application operating at the end user terminal in some embodiments. In other embodiments, web browser-based portal can also be used to provide the user interface for UI module 230. Any other configuration to remotely or locally accessing content delivery system 206 can also be used in the various embodiments. One exemplary configuration for the user interface is illustrated in FIGS. 12, 13, and 14.

Figure 12:
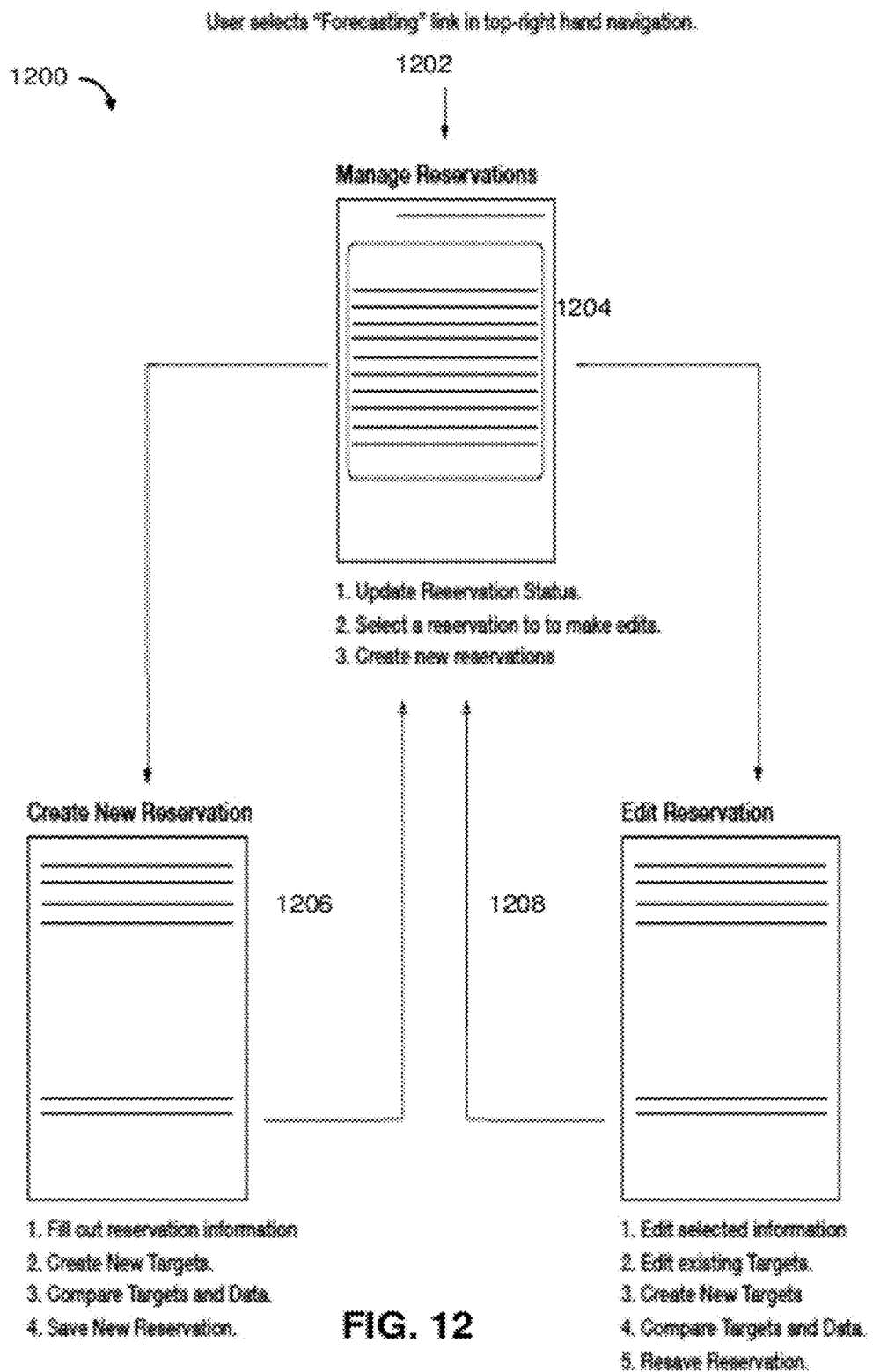
FIG. 12 shows a first exemplary screen of a user interface for booking and managing electronic campaigns.

FIG. 12 shows a workflow 1200 for an exemplary user interface for requesting, booking, and managing campaigns. As shown in FIG. 12, the workflow begins when a user selects a "forecasting" link or other link at 1202 to begin the campaign requesting, booking, and management process at a first screen 1204. At screen 1204, the user is provided a reservation management screen to view and manage the various campaigns already booked (i.e., reserved) by the user. Screen 1204 can be configured to allow the user to perform various tasks. For example, as shown in FIG. 12, screen 1204 can be used to update a status of one or more campaigns ("Update Reservation Status"), select a campaign to be adjusted ("Select a reservation to make edits"), or plan and book new campaigns ("Create new reservations"). An exemplary configuration of this screen will be described below in greater detail with respect to FIG. 14.

Responsive to user inputs at screen 1204, the user can then be directed to screens for booking new campaigns (screen 1206) or for adjusting existing campaigns (screen 1208). At screen 1206, the user interface can be configured to allow the user to input advertiser information ("Fill out reservation information"), specify campaign targets ("Create New Targets"), analyze proposed campaigns ("Compare Targets and Data"), and book campaigns ("Save New Reservations"). At screen 1208, which might be the same as screen 1206, the user can adjust advertiser information ("Edit selected information"), adjust campaign targets ("Edit existing Targets"), add additional targets ("Create New Targets"), analyze proposed campaigns ("Compare Targets and Data"), and book the updated campaign ("Resave Reservations"). The content of screens 1206 and 1208 will be described below in greater detail with respect to FIG. 14. Once the reservation information is created and/or updated at either of screens 1206 or 1208, the workflow 1200 is configured to return to screen 1202.

FIG. 13 shows an exemplary configuration for screen 1206. The configuration of screen 1208 can be substantially similar to that shown for screen 1206. Accordingly, the description below for screen 1206 is sufficient for describing the arrangement and operation of screen 1208. In the configuration illustrated in FIG. 13, the screen 1206 is accessed by selecting a "Create Reservations" link, such as link 1302. As described above, users can used screen 1206 to review and make updates to reservations they have already created, as well as create new reservations.

In a first section 1304, a user can input information regarding the advertiser. For example, users can input:
  Advertiser Name (e.g., by inputting or selecting name of Advertiser)
  Ad Model (e.g., by selecting from a list of ad model types)
  Sold by (e.g., by selecting from a list of Assignees)
  Start Date (e.g., by selecting from a calendar pop-up panel)
  End Date (e.g., by selecting from a calendar pop-up panel)
  Budget (e.g., by inputing an amount or other values)
  Opportunity ID: Salesforce ID #

In a second section 1306, a user can input inventory atom target information (i.e., the inventory slot of interest). In the configuration shown in FIG. 13, presence of a selection is indicated by checkmarks or other indicia at various points in section 1306, as described below. Section 1306 can include various portions. As shown in FIG. 13, section 1306 includes a top level navigation link or tabs 1308 for accessing a selection screen for selecting atoms associated with each of the tabs 1308. For example, the tabs 1308 can be used to categorize atom selection by Geography, Audience, Device, or Media. As described above and as shown in FIG. 13, a checkmark or other indica can be used to indicate selection of atoms associated with each of these tabs 1308.

For each of tabs 1308, section 1306 can also include an interface for selection of segment characteristics for the inventory atoms. In the exemplary configuration shown in FIG. 13, the various characteristics can be categorized and accessed in several ways. In FIG. 13, segment characteristics are associated with sub-level navigation links 1310 for each of the tabs 1308. The link 1310 can be selected to access different groups of segment characteristics within each of tabs 1308. Similar to tabs 1308, the links 1310 can be configured to include indicia of the user's selections associated with one or more of the links. For example, as shown in FIG. 13, the link can indicate the number of segment characteristics selected: "Spending Levels (3 of 6 selected)". Selection of segment characteristics can then be performed using options 1312, as shown in FIG. 13. In FIG. 1312, the options 1312 are a hierarchy of collapsible selection checkboxes.

In the present technology, the number and arrangement of tabs 1308, links 1310, and options 132 can vary according to the various segment characteristics available and the categorization provided. One exemplary configuration of tabs and links leading to selectable options is shown below
  Geography:
    Country
    Zip Code
  Audience:
    Demographics
      Age Group
      Gender
      Income
      Ethnicity
      Life Stage
      Marital Status
    Preferences
      Apps
      Movies
      Music
      TV
      Books
    Spending Levels
      Apps
      Movies
      Music
      TV
      Books Frequency
  Apps
  Movies
  Music
  TV
  Books
Device:
Devices
  Carrier
  Devices
  Models
  OS Name
Media:
Media Types
  App Category
  Content Rating
  Section
  Placement
  Media Type
  Content Exclusions
  Day Parting
  DOW (Day of Week)

Portion 1306 further includes a section 1314 for creating a name for the target generated via the selections in sections 1308, 1310, and 1312. This target name can then be used to subsequently identify the target in other portions of the user interface. Additionally, section 1314 can also specify a portion for identify an amount or a portion of the user's budget to be used for the target inventory atoms. Finally, section 1314 ca include a link or control for saving and/or clearing the information entered by the user in section 1306.

Screen 1206 can also be configured to include a target information section 1316. Section 1316 can include a target details portion 1318 that displays a table of the targets specified by the user for the campaign and associated information. Thus, when a target is saved in section 1306, a new table row is created in target details portion 1318. Further, the new row can be highlighted for editing. The row of information can be configured to display the newly created target name, target data based on selections section 1306, and budget information. In the exemplary configuration of FIG. 13, portion 1318 is configured with the following columns:

Target Name (Name specified in section 1306 for saved target);

Ad Requests (Total projected number of requests for the atoms associated with the saved target);

Allocated Requests (Total number of requests for atoms that are already queued for fulfillment by content delivery system);

Unallocated available (=Ad Requests−Allocated Requests);

Reserved impressions (Atoms reserved by content delivery system but not committed for any campaign);

Projected Available (=Requests−Unallocated−Reserved);
Available Fill; and

Budget Used (Amount for budget projected to be used for target).

In addition to the information columns, portion 1318 can also include an Action Column for managing the targets. In FIG. 13, the action column can be configured to allow a user to copy, edit, or delete targets.

Section 1316 can also include a target summary portion 1320 to display a summary of the various targets in portion 1318. Thus, portions 1318 and 1320 allow user to view the impact of targets and changes in availability of atoms on slot-by-slot basis or globally. Once the user has finalized the various targets, screen 1206 can be configured to allow the user to name and save (i.e. book) the reservation. In some cases, the screen can also be configured with additional options for the user. For example, in some configurations, controls can be provided for exporting information portion 1320 to other programs for further study and analysis. Further, section 1316 can be configured to allow users to directly compare rows in portion 1318.

Additionally, links can be provided to allow users to jump to different portions of screen 1206. For example, a "CREATE NEW TARGET" link can be provided in section 1316 that moves a current view or focus of screen 1206 to sections 1304 and/or 1306. Further, this link can also clears the current information in sections 1304 and 1306 to allow the user to input new information.

As described above in FIG. 12, once the user is finished at screen 1206 (e.g., by saving or canceling the reservation being developed in screen 1206), the workflow 1200 directs the user back to screen 1204. At screen 1204, the various saved reservations can then be managed.

FIG. 14 shows an exemplary configuration for screen 1204. As shown in FIG. 14, screen 1204 shows a table, similar to that in FIG. 13. However, the table in screen 1204 can be configured to show addition information and provide different actions. In particular, the table in FIG. 14 shows columns:

Reservation Name (name created in screen 1206);

Opportunity ID (e.g., Salesforce ID which was entered in screen 1206);

Reserved Impressions (Number of impressions reserved by sales planners but not allocated/committed);

Projected Availability (Requests−Unallocated−Reserved);
Available Fill; and

Expiration Date (Displays expiration date of given reservation, and can have a color indicator to show severity of expiration. E.g., Green Icon if more than 1 month, Yellow Icon if less than 1 month, and Red Icon if less than 3 days. The expiration date text can also be displayed with colors in a similar way).

Additionally, as shown in FIG. 14, an Actions Column can also be provided. This column can houses all the functionality the user has for editing, copying, renewing, and deleting reservations. In the case of an edit, the user can be directed back to screen 1206 to adjust the reservation. In the case of copying, the user can be prompted to provide a new reservation name. Additionally, the user can be directed back to screen 1206 to make any necessary adjustments for the copy. In the case of renewing, the expiration date can be reset to a different date. This renewal can be for a fixed period (e.g., 30, 45, or 90 days) or can be user-specified.

In addition to the columns, other functionality can be provided in screen 1204. For example, a search dialog can be provided to allow users to find reservations. Additionally, a link or control can be provided to cause that a new reservation be created.

Although the screens in FIGS. 12, 13, and 14 are shown as including a specific arrangement of screen elements, the various embodiments are not limited in this regard. That is, the various screens in FIGS. 12, 13, and 14 can include more or less elements than shown. Thus, the number and arrangement of input elements and output elements can vary in the screens can vary. Additionally, the types of input elements can also vary and are not limited to those shown. For example, user input elements in the various embodiments can include check boxes, combo boxes, drop-down lists, grid views, list boxes, radio buttons, scrollbars, sliders, spinners, and text boxes, to name a few. Similarly, the number and type of output elements can also vary. Finally, although a particular arrangement and number of screens is illustrated in FIGS. 12, 13, and 14, the present disclosure contemplates that other arrangements and numbers of screens can be used to provide an equivalent functionality.

Further, although the user interface and UI interface 230 are described above as providing specific types of functionality for specific types of end users, the user interface and UI module 230 can also be configured to allow other interactions between end users and the content delivery system 206. For example, the user interface and UI module 230 can be used to specify any of the parameters, weights, or any other variables for the systems and methods described herein. In another example, the user interface can also be user to view, analyze, and/or modify any final or intermediate results or data generated by any of the systems and methods described herein. In yet another example, the user interface and UI module 230 can also provide a reporting/analysis interface area designed for mining/analyzing performance of content from the secondary providers in terms of CTR, eCPM, cost measures, revenue measures, etc. Additionally, UI module 230 can be configured to sends notifications and alerts to users associated with primary content providers 210 (via email, messaging, etc.) when a campaign runs low, a budget runs low, or any other event of interest occurs. Additionally, the UI module 230 can also send daily/weekly/monthly reports of campaign delivery performance and suggestions for optimization to the content providers 210 and 214.

In one exemplary configuration, the user interface and the UI module 230 can be configured to provide administrative users and/or end users the ability to manipulate, select, and customize inventory atoms into groupings. Further, the user interface and the UI module 230 can allow such users to save these groupings with a custom name and/or book such groupings of inventory atoms. In such a configuration, the user interface can provides a series of selection objects (e.g., drop down boxes) for each dimension of interest. In some cases, these selection objects can be linked. For example, if a country is selected in one drop down box, a state drop down box automatically filters the drop down values to only country-specific states, and so forth. Additionally, as selections are made, the user interface can provide a region with a visual representation of inventory availability (e.g., a pie chart, and/or histogram). In some configurations, this region can present past, present, and future availability. Further, the region can also be adjusted to show the period of time of interest (e.g., 3, 6, 9, or 12 months). The user interface can also include a portion for end users to input their fixed parameters (e.g., budget, performance/cost objectives, time length of campaign, etc). These parameters can be used to further filter and update the visual representation of available inventory atoms as the user continues to select additional dimensions of interest (i.e., identify inventory slots of interest). The user interface can include a portion or area for temporarily reserving a proposed inventory slot or other proposed booking of inventory atoms for a limited period of the time (e.g., 24-48 hours).

In some configurations, a warning message can be provided to show the user that a demanded impressions volume may be much bigger than what is available. That is, when a requested inventory slot intersects with one or more booked inventory slots. In such cases, the user interface can be configured to provide a visual representation indicating the inventory atoms at issue. Further, the user interface can be configured to provide a visual representation that indicates alternative inventory atoms. In some cases, a visual representation of different combinations of alternative inventory atoms that fulfill the end user's demand can be generated and the user can be permitted to select from among the combination.

Other implementations according to these examples include computer-readable media for carrying or having computer-executable instructions or data structures stored thereon. Such computer-readable media can be any available media that can be accessed by a general purpose or special purpose computer. By way of example, and not limitation, such tangible computer-readable media can include RAM, ROM, EEPROM, CD-ROM or other optical disk storage, magnetic disk storage or other magnetic storage devices, or any other medium which can be used to carry or store desired program code means in the form of computer-executable instructions or data structures.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Communication at various stages of the described system can be performed through a local area network, a token ring network, the Internet, a corporate intranet, 802.11 series wireless signals, fiber-optic network, radio or microwave transmission, etc. Although the underlying communication technology may change, the fundamental principles described herein are still applicable.

The various embodiments described above are provided by way of illustration only and should not be construed as limiting. Those skilled in the art may recognize various modifications and changes that may be made while following the example embodiments and applications illustrated and described herein, and without departing from the true spirit and scope of the present disclosure.

The invention claimed is:

1. A computer-implemented method, comprising:
  identifying active electronic campaigns associated with a content delivery system, each of the active electronic campaigns specifying a performance criteria, campaign metadata, and an inventory slot comprising atoms from an inventory space being managed by the content delivery system;
  computing, via a processor, a priority ranking associated with the active campaigns; and allocating the atoms to the active electronic campaigns during the next time interval according to the atom order indicated in the priority ranking and based at least on an availability of the atoms during the next time interval and the performance criteria, the performance criteria specifying an interval cap that limits a number of atoms that may be assigned to a respective active electronic campaign for the next time interval, the next time interval being shorter than a length of an active electronic campaign duration, wherein each of the atoms represents available targets for a segment of characteristics, the allocating further comprising:

estimating a first availability of the atoms for the inventory slot during the next time interval based on at least a past performance and a past allocation of the atoms in the inventory space, estimating a second availability of the atoms for the inventory slot for subsequent time intervals during a length of a selected active electronic campaign based on at least a past performance and a past allocation of the atoms in the inventory space, increasing the interval cap for the next time interval when the second availability of atoms for the subsequent time intervals is insufficient to meet the performance criteria, assigning at least a portion of available atoms to the selected active electronic campaign based at least on the increased interval cap, and marking the available atoms assigned to the selected active electronic campaign as unavailable for other active electronic campaigns.

2. The method of claim 1, wherein the priority ranking comprises an atom allocation priority indicating an order for allocating each of the atoms to the active electronic campaigns during a next time interval, wherein the priority ranking is based on a targeting granularity of respective slots associated with the active electronic campaigns, and wherein computing the priority ranking further comprises:

determining a relative priority of the active campaigns based on a pre-defined priority criteria, the pre-defined priority criteria being based on a remaining time associated with each of the active campaigns, and wherein the relative priority is used to allocate an atom required by multiple campaigns to an active campaign selected based on the relative priority; and specifying as the priority ranking a list of the active campaigns ordered according to the relative priority.

3. The method claim 1, wherein the step of allocating further comprises:

prior to allocating the atoms, selecting a highest ranked one of the active campaigns based on the priority ranking;

after assigning at least a portion of the available atoms, selecting a next highest ranked one of the active campaigns based on the priority ranking; and repeating the steps of selecting and assigning until the active campaigns in the priority ranking are exhausted.

4. The method of claim 1, wherein the priority ranking is based on a weighted combination of time remaining, atoms targeted, and invitational content provider preferences.

5. A non-transitory computer-readable medium having stored therein instructions which, when executed by a processor, cause the processor to perform operations comprising:

receiving a campaign request generated at a user interface, the campaign request comprising a performance criteria, campaign metadata, and at least one requested inventory slot of atoms from an inventory space managed by a content delivery system, wherein each of the atoms represents a portion of traffic for a segment of characteristics;

delivering a proposed campaign to the user interface, the proposed campaign comprising a proposed inventory slot of atoms based on the campaign request and an estimate of an availability of atoms in the inventory space; and responsive to an acceptance of the proposed campaign at the user interface, allocating atoms from the inventory space during a next time interval to at least one of the proposed campaign and other previously accepted campaigns, wherein the content delivery system allocates atoms from the inventory space based on at least the availability of atoms in the inventory space during the next time interval, the performance criteria, and the campaign metadata of the campaign request, the performance criteria specifying an interval cap that limits a number of atoms allocated for a time interval, the time interval being shorter than a length of an accepted campaign duration, the allocating comprising:

estimating a first availability of the atoms for the slot during the next time interval based on at least a past performance and a past allocation of the atoms in the inventory space, estimating a second availability of the atoms for the slot for subsequent time intervals during a length of a selected campaign based on at least a past performance and a past allocation of the atoms in the inventory space, increasing the interval cap for the next time interval when the availability of atoms for the subsequent time intervals is insufficient to meet the performance criteria, assigning at least a portion of the available atoms to the selected campaign based at least on the increased interval cap, and marking the assigned atoms as unavailable for other campaigns.

6. The non-transitory computer-readable medium of claim 5, wherein the step of delivering further comprises:

modeling an availability of the atoms based on at least a history of the atoms in the inventory space; and determining a proposed inventory slot for fulfilling the campaign request based on the modeled availability of the atoms and the performance criteria.

7. The non-transitory computer-readable medium of claim 6, wherein the proposed inventory slot identifies a proposed allocation of atoms from the inventory space during the next time interval and one or more subsequent time intervals.

8. The non-transitory computer-readable medium of claim 5, wherein the step of allocating further comprises:

generating a priority ranking of campaigns based on at least the campaign metadata; and associating atoms having availability during the next time interval with at least a portion of the campaigns based on at least the priority ranking.

9. The non-transitory computer-readable medium of claim 8, wherein the step of generating the priority ranking further comprises:

determining a relative priority of the atoms for allocating to campaigns based on a pre-defined priority criteria; and specifying a list of atoms for allocating to campaigns ordered according to the relative priority.

10. The non-transitory computer-readable medium claim of 8, wherein the step of associating further comprises:

prior to allocating atoms, selecting a highest ranked campaign based on the priority ranking;
after assigning the portion of the atoms, selecting a next highest ranked campaign based on the priority ranking; and
repeating the steps of selecting and assigning until all the atoms have been allocated to the campaigns.

11. An advertisement server, comprising:
a storage element for storing data identifying one or more active electronic advertisement campaigns, each of the active campaigns specifying a performance criteria, campaign metadata, and at least one inventory slot comprising atoms from an inventory space, wherein each atom represents a portion of traffic for a segment of characteristics; and
a processing element for managing the atoms from the inventory space, wherein the processing element is configured for:
 computing a priority ranking of the active campaigns for a next time interval based on at least on the campaign metadata, and
 allocating the atoms to the active campaigns during the next time interval according to the priority ranking based at least on an availability of the atoms during the next time interval and the performance criteria, the performance criteria specifying an interval cap that limits a number of atoms to allocate for a time interval, the time interval being shorter than a length of an active campaign duration, the allocating comprising:
  estimating a first availability of the atoms for the slot during the next time interval based on at least a past performance and a past allocation of the atoms in the inventory space,
  estimating a second availability of the atoms for the slot for subsequent time intervals during the length of a selected campaign based on at least a past performance and a past allocation of the atoms in the inventory space,
  increasing the interval cap for the next time interval when the availability of atoms for the subsequent time intervals is insufficient to meet the performance criteria, and
  assigning at least a portion of the available atoms to the selected campaign based at least on the increased interval cap and marking the assigned atoms as unavailable for other campaigns.

12. The server of claim 11, wherein the storage element is further configured for storing past performance and past allocation of the atoms in the inventory space, and wherein the processing element is further configured for estimating the availability of the atoms during the next time interval using a model based on at least the past performance and the past allocation.

13. The server of claim 11, wherein the processing element is further configured for allocating the atoms by generating a priority ranking of the active campaigns based on at least the campaign metadata and associating the atoms having availability during the next time interval with at least a portion of the active campaigns based on at least the priority ranking.

14. The server of claim 13, wherein the processing element is further configured for generating the ranking by determining a relative priority of the active campaigns based on a pre-defined priority criteria and specifying as the priority ranking a list of the active campaigns ordered according to the relative priority.

15. The server of claim 13, wherein the processing element is further configured for associating atoms by:

prior to allocating the atoms, selecting a highest ranked campaign based on the priority ranking;
after assigning the portion of the atoms, selecting a next highest ranked campaign based on the priority ranking; and
repeating the assigning and selecting until the active campaigns in the priority ranking are fully allocated with atoms.

16. A content delivery system, comprising:
a processor;
an allocation module configured to control the processor to allocate atoms from an inventory space during a next time interval to one or more active campaigns based on at least an availability of the atoms during a next time interval, performance criteria, and campaign metadata associated with the active campaigns, the performance criteria specifying an interval cap that limits a number of atoms for allocating for a time interval, the time interval being shorter than a length of an active campaign duration, wherein each atom represents a portion of traffic for a segment of characteristics, the allocating comprising:
 estimating a first availability of the atoms for the slot during the next time interval based on at least a past performance and a past allocation of the atoms in the inventory space,
 estimating a second availability of the atoms for the slot for subsequent time intervals during the length of a selected campaign based on at least a past performance and a past allocation of the atoms in the inventory space,
 increasing the interval cap for the next time interval when the second availability of atoms for the subsequent time intervals is insufficient to meet the performance criteria, and
 assigning at least a portion of the available atoms to the selected campaign based at least on the increased interval cap, and
 marking the assigned atoms as unavailable for other campaigns;
a storage element for storing a history of the atoms, the history comprising a past allocation and a past performance of the atoms; and
a booking module configured to control the processor to generate at least one additional active campaign based on a campaign request and an estimate of the availability of the atoms in the inventory space,
wherein the campaign request comprises at least one requested inventory slot, a performance criteria, and campaign metadata, the requested inventory slot identifying a requested portion of atoms from an inventory space during one or more requested time intervals, and wherein the estimate is based on at least the history.

17. The system of claim 16, wherein the booking module is further configured to control the processor to model an availability of the atoms based on at least a past performance and a past allocation of the atoms in the inventory space, and assemble the additional active campaign based on a proposed inventory slot for fulfilling the campaign request based on the modeled availability of the atoms and the performance criteria.

18. The system of claim 17, wherein the proposed inventory slot identifies a proposed allocation of atoms from the inventory space during one or more proposed time intervals.

19. The system of claim 16, wherein the allocation module is configured to control the processor to allocate the atoms by generating a priority ranking of the accepted campaigns based at least on the campaign metadata, and associating the atoms having availability during the next time interval with at least a portion of the accepted campaigns based on at least the priority ranking.

20. The system of claim 19, wherein the allocation module is configured to control the processor to generate the priority ranking by determining a relative priority of the accepted campaigns based on a pre-defined priority criteria, and specifying as the priority ranking a list of the accepted campaigns ordered according to the relative priority.

21. The system of claim 19, wherein the allocation module is configured to control the processor to associate the atoms by:
- prior to allocating atoms, selecting a highest ranked one of the active campaigns based on the priority ranking,
- after assigning the portion of the atoms, selecting a next highest ranked one of the active campaigns based on the priority ranking, and
- repeating the assigning and selecting until the active campaigns in the priority ranking are exhausted.

* * * * *